(12) United States Patent
Sasagawa

(10) Patent No.: US 8,094,950 B2
(45) Date of Patent: Jan. 10, 2012

(54) SIGNAL PROCESSOR

(75) Inventor: Yukihiro Sasagawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 1169 days.

(21) Appl. No.: 11/714,835

(22) Filed: Mar. 7, 2007

(65) Prior Publication Data

US 2007/0211953 A1    Sep. 13, 2007

(30) Foreign Application Priority Data

Mar. 7, 2006  (JP) ................................ 2006-060864

(51) Int. Cl.
*G06K 9/36* (2006.01)
*G06K 9/46* (2006.01)
*G06K 9/00* (2006.01)

(52) U.S. Cl. ......... 382/232; 382/238; 382/248; 382/251

(58) Field of Classification Search .................. 382/232, 382/238, 248, 251
See application file for complete search history.

(56) References Cited

U.S. PATENT DOCUMENTS

| | | | |
|---|---|---|---|
| 5,684,536 A | 11/1997 | Sugiyama et al. | |
| 5,717,705 A * | 2/1998 | Shikakura et al. | ............ 714/746 |
| 5,805,727 A | 9/1998 | Nakano | |
| 5,845,041 A * | 12/1998 | Ohkuma et al. | ............... 386/263 |
| 6,493,391 B1 | 12/2002 | Komori et al. | |
| 2003/0190084 A1 | 10/2003 | Yamaguchi et al. | |
| 2005/0129321 A1* | 6/2005 | Yamaguchi et al. | .......... 382/239 |
| 2006/0140487 A1 | 6/2006 | Tabata et al. | |

FOREIGN PATENT DOCUMENTS

CN    2648738 Y    10/2004

OTHER PUBLICATIONS

Tasdizen, O.—"A high performance and low cost hardware architecture for H.264 transform and quantization algorithms" —2005— 13th European Signal Processing Conference.*
English translation of Chinese Office Action issued in Chinese Patent Application No. 200710080396.5, mailed Jan. 8, 2010.

* cited by examiner

*Primary Examiner* — Bernard Krasnic
(74) *Attorney, Agent, or Firm* — McDermott Will & Emery LLP

(57) ABSTRACT

A data compressing method comprises first step in which a data is orthogonally transformed so that an orthogonal transform data is generated. A processing step executed subsequent to the first step is divided into a processing step for an alternate-current component of the orthogonal transform data and a processing step for a direct-current component of the orthogonal transform data. The processing step for the direct-current component includes a second step in which an inverse transform equivalent to a decoding process of the orthogonal transform data is executed on the orthogonal transform data.

35 Claims, 20 Drawing Sheets

F I G. 2 A
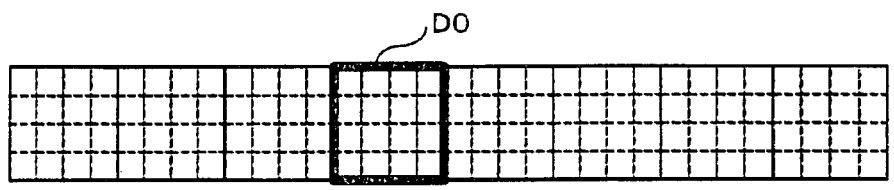
F I G. 2 B
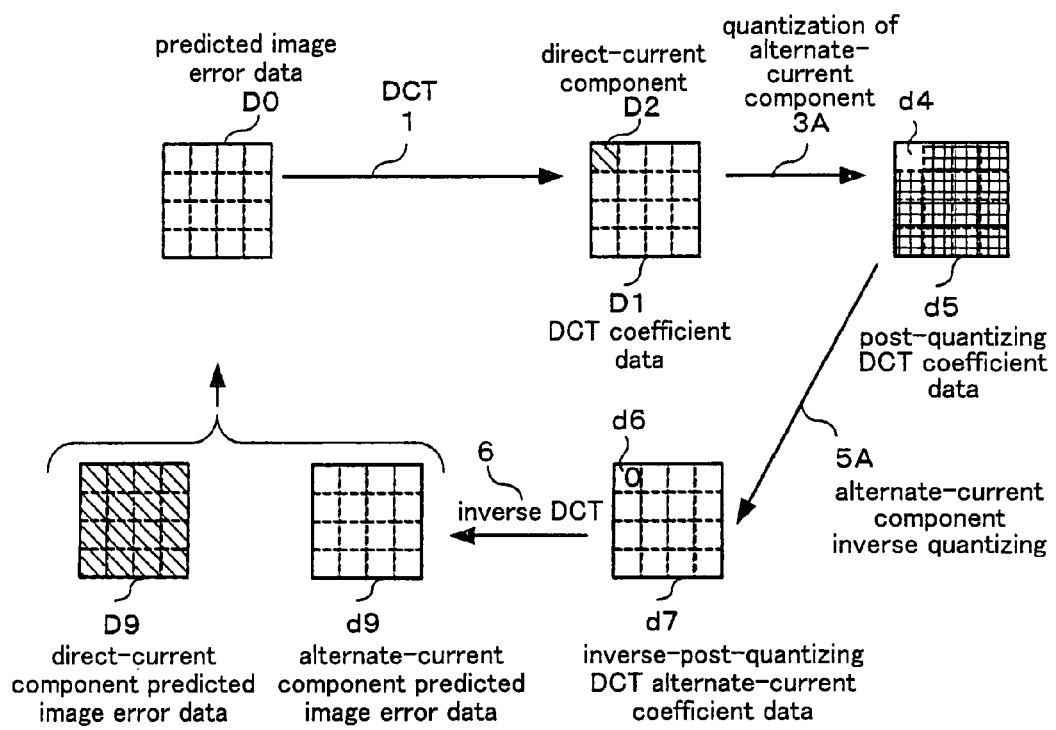

F I G. 4
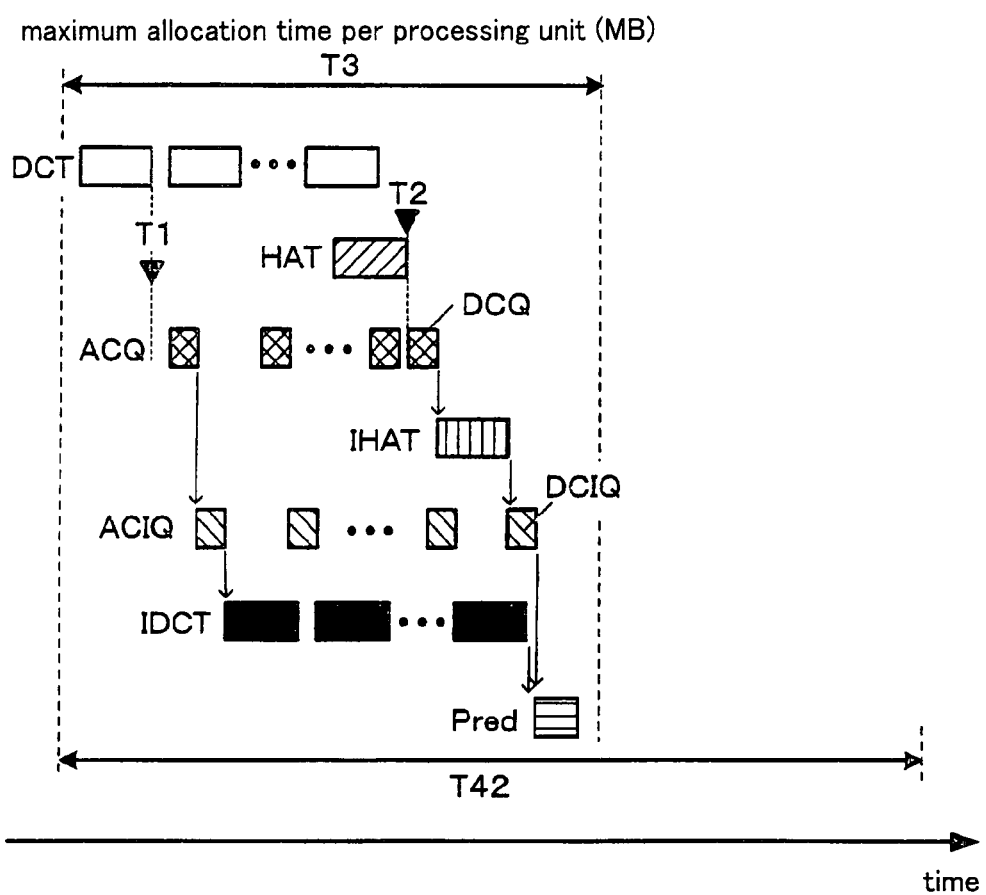

F I G. 5
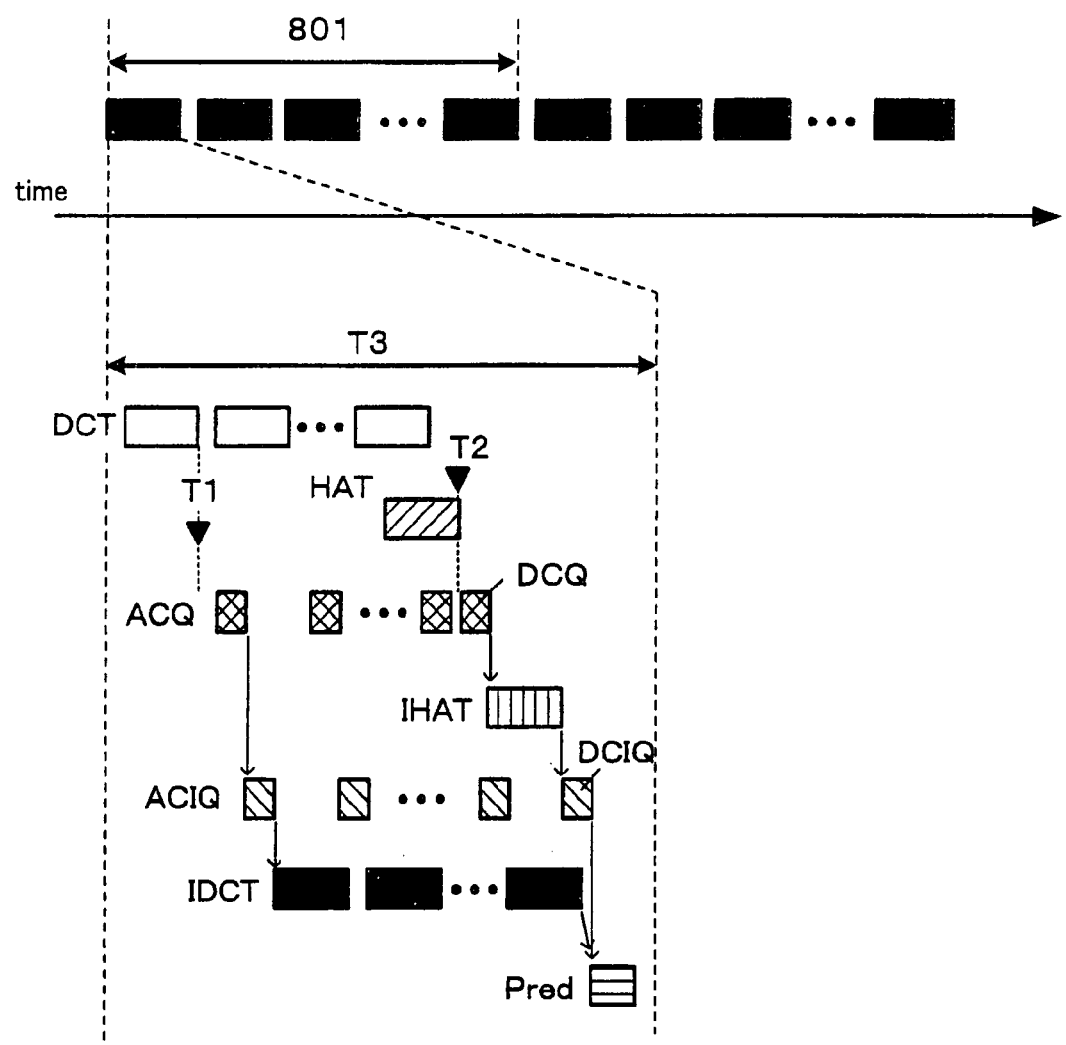

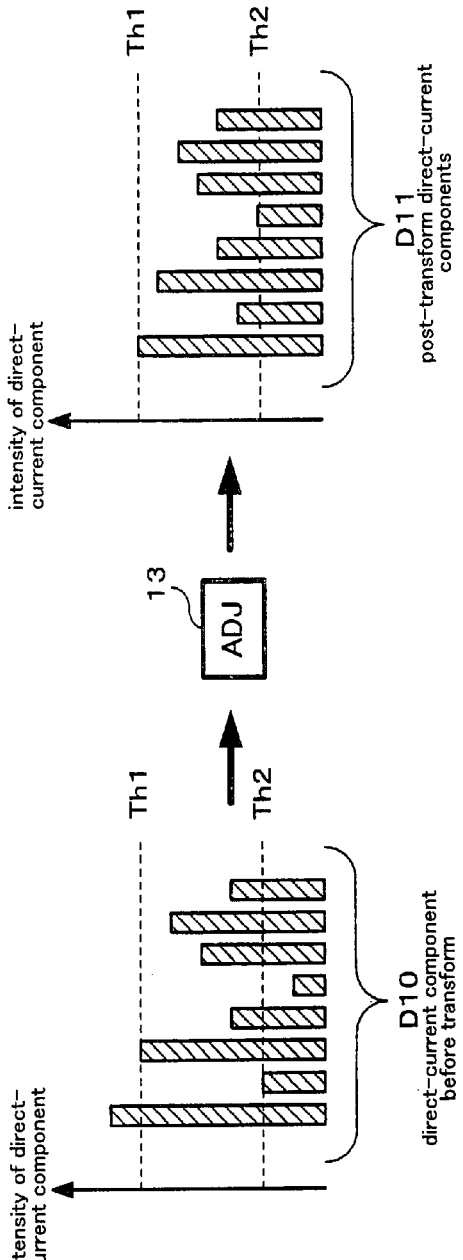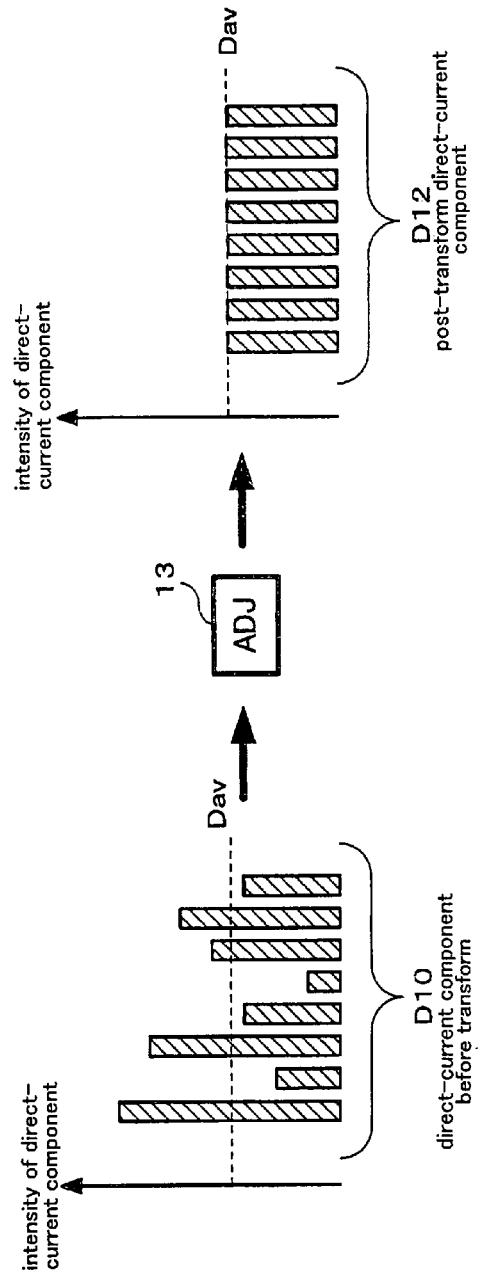
FIG. 9A
FIG. 9B

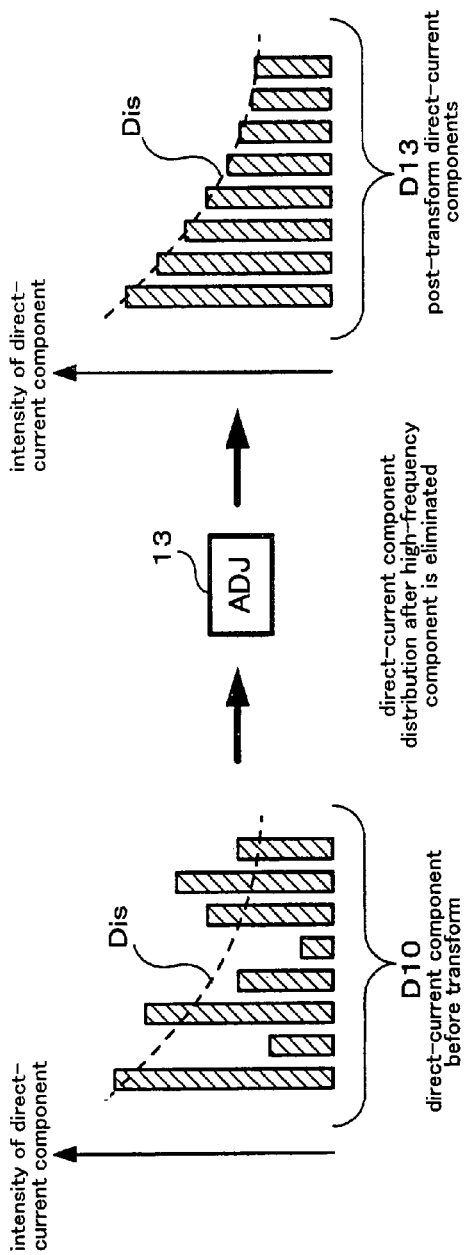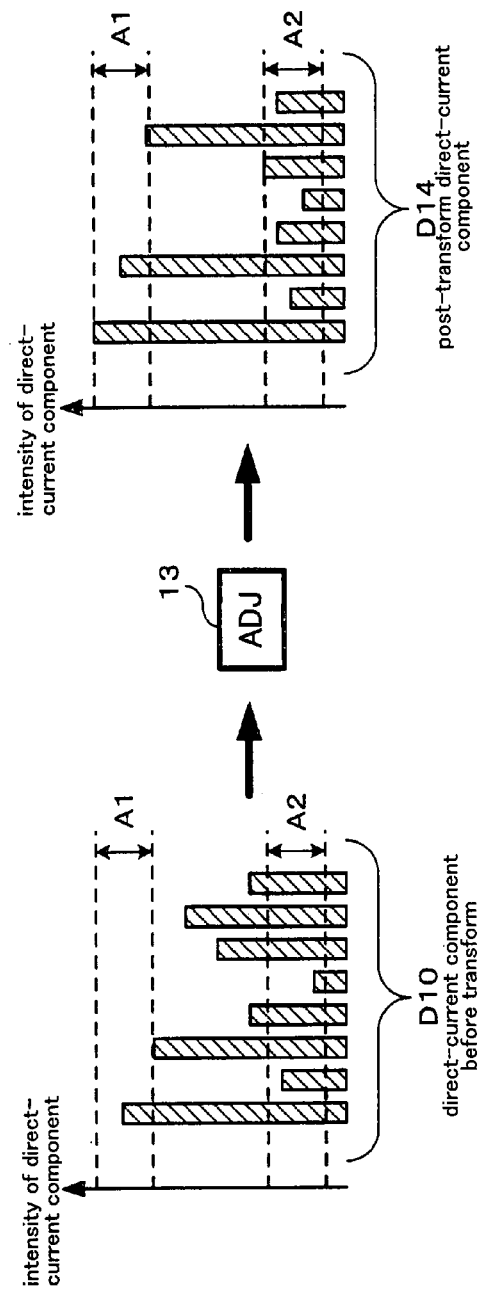
FIG. 10A
FIG. 10B

F I G. 1 3
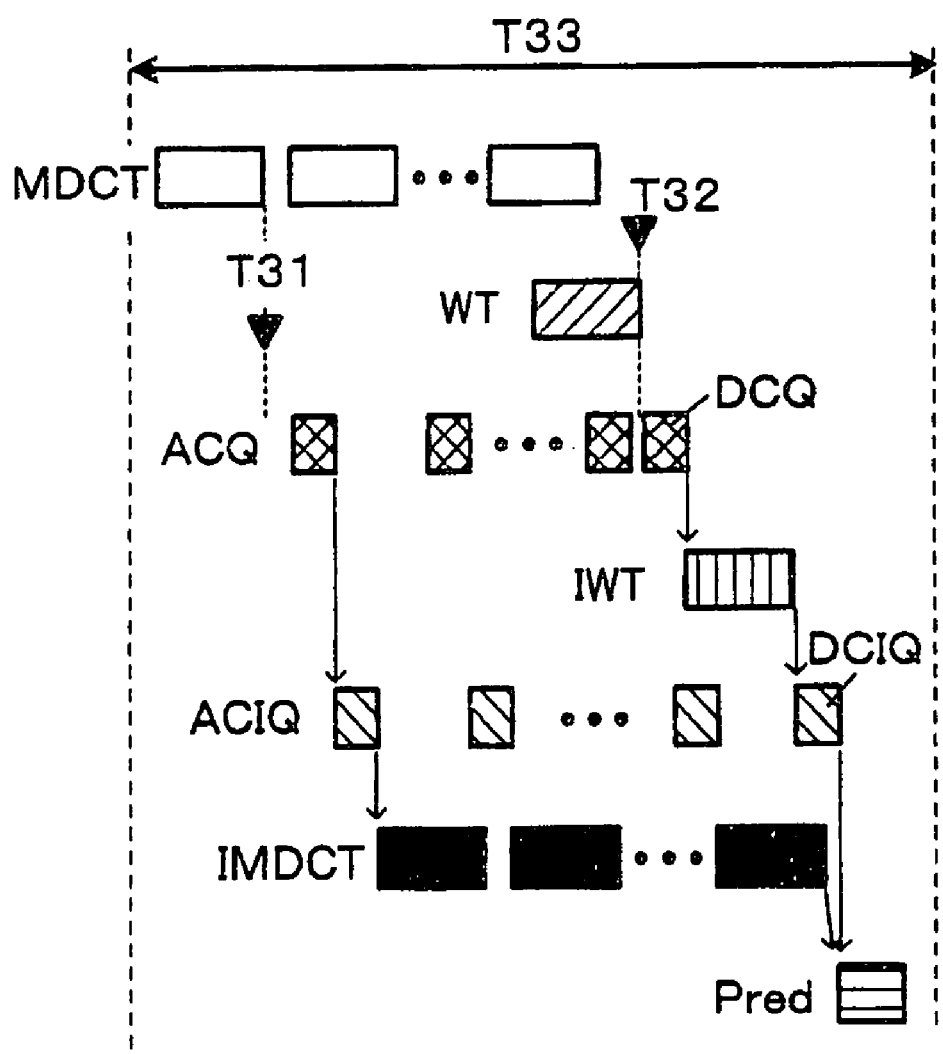

F I G. 1 4 A
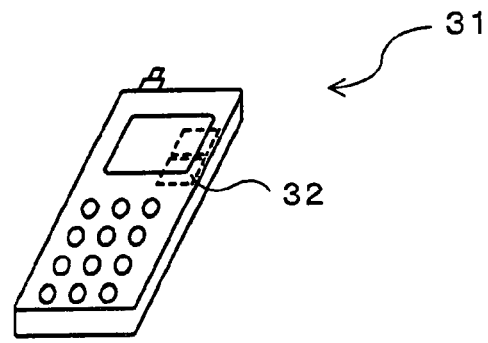
F I G. 1 4 B
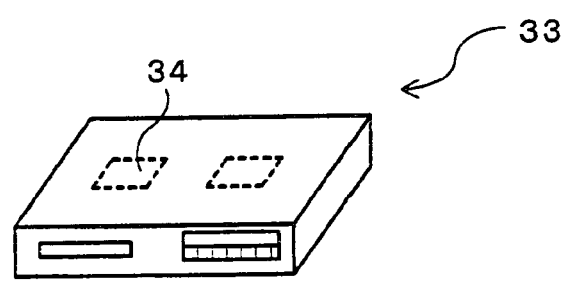
F I G. 1 4 C
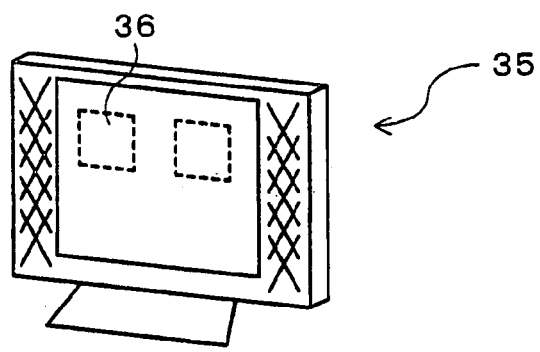
F I G. 1 4 D
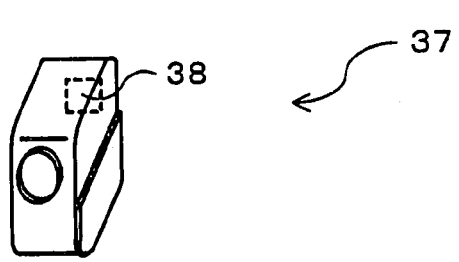

F I G. 1 6 A  Prior Art
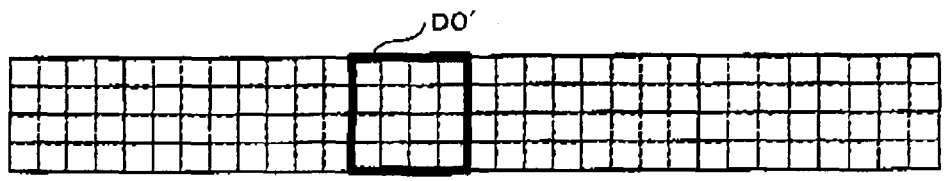
F I G. 1 6 B  Prior Art
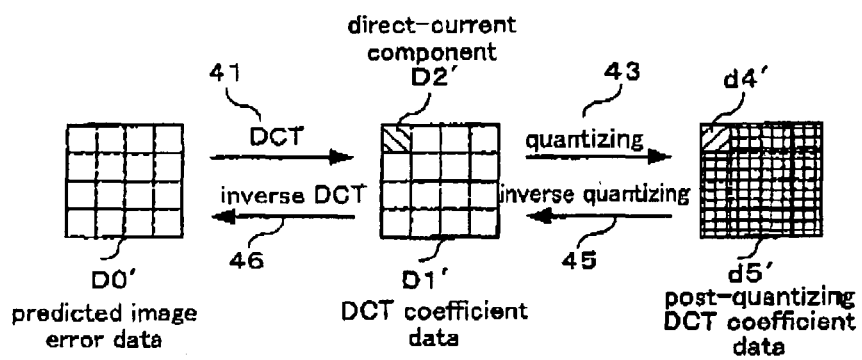
F I G. 1 6 C  Prior Art
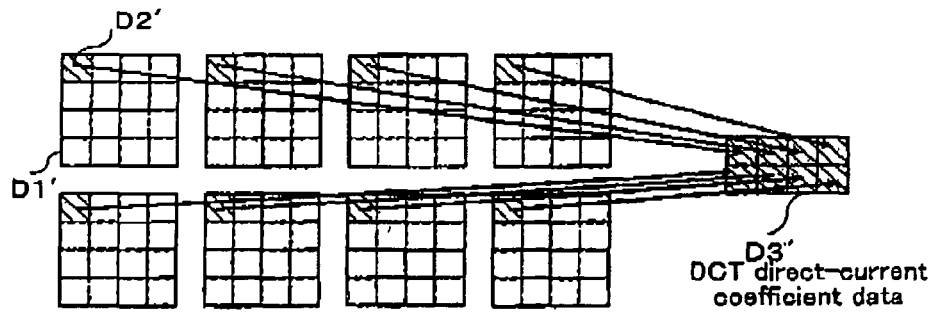

F I G. 1 7 A  Prior Art
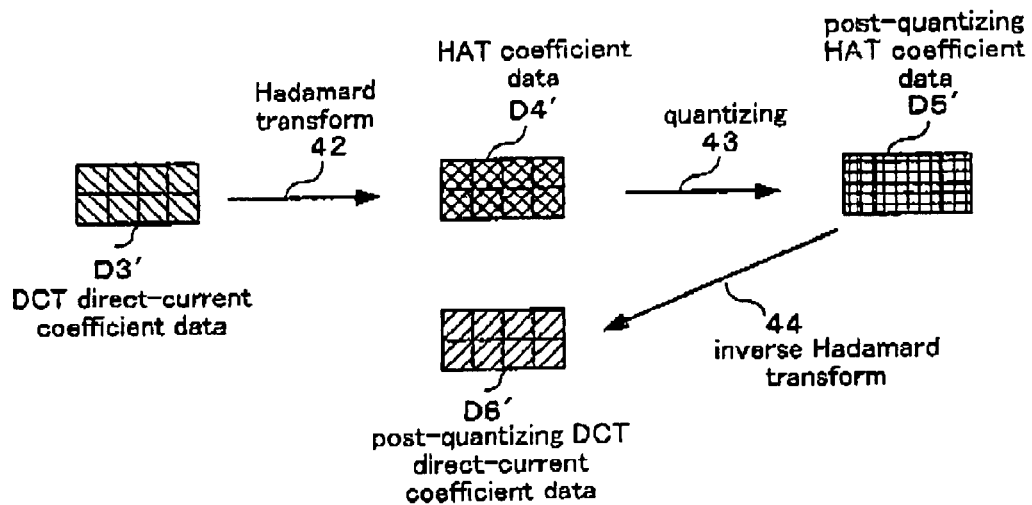
F I G. 1 7 B  Prior Art
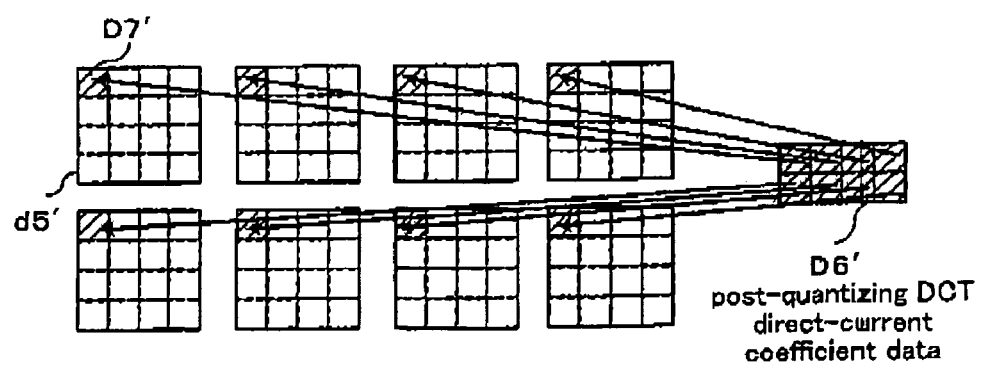

F I G. 1 8 Prior Art
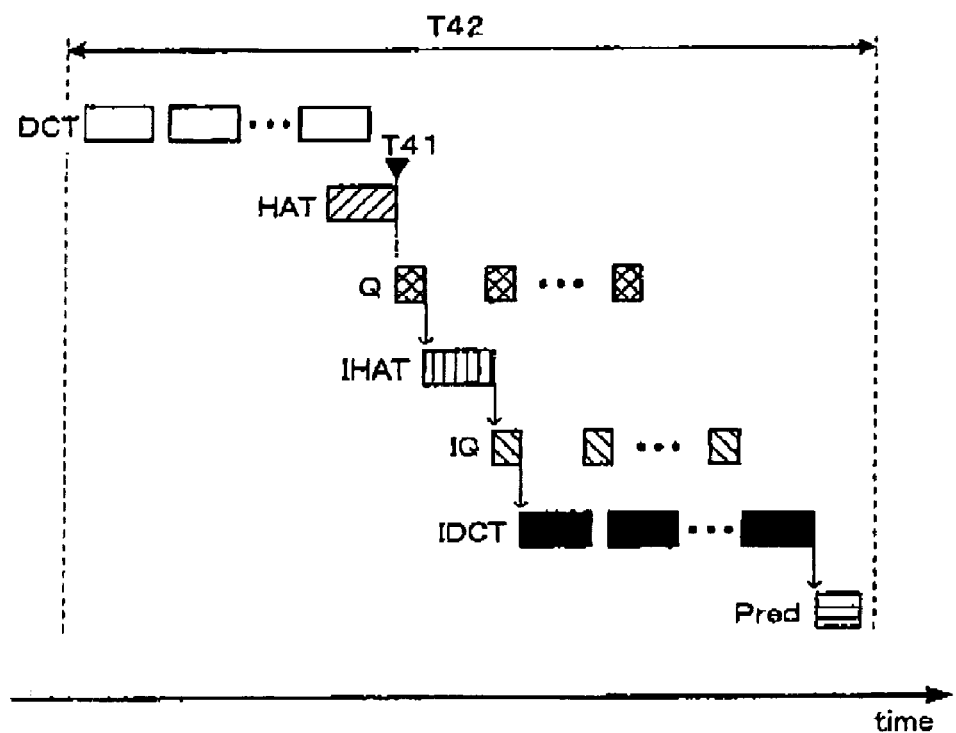

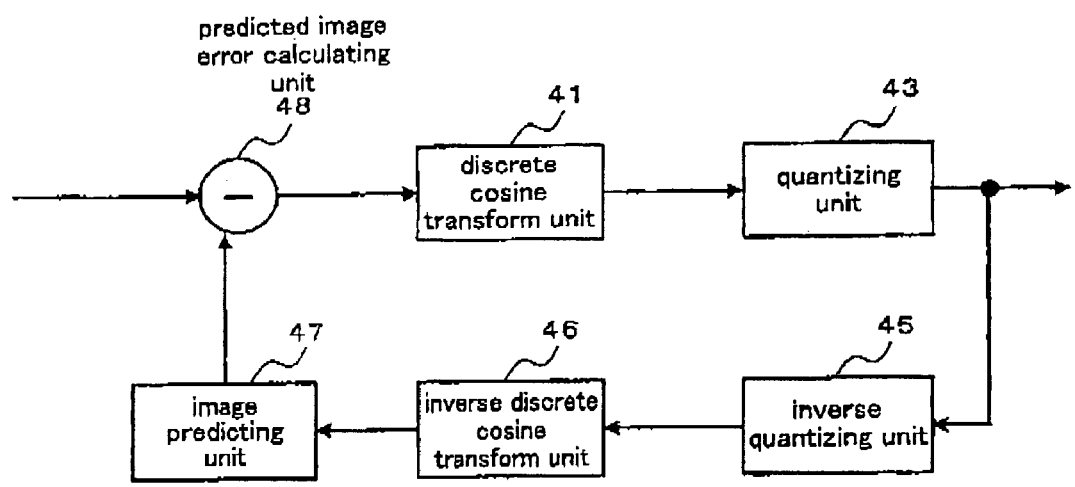
F I G. 1 9 Prior Art

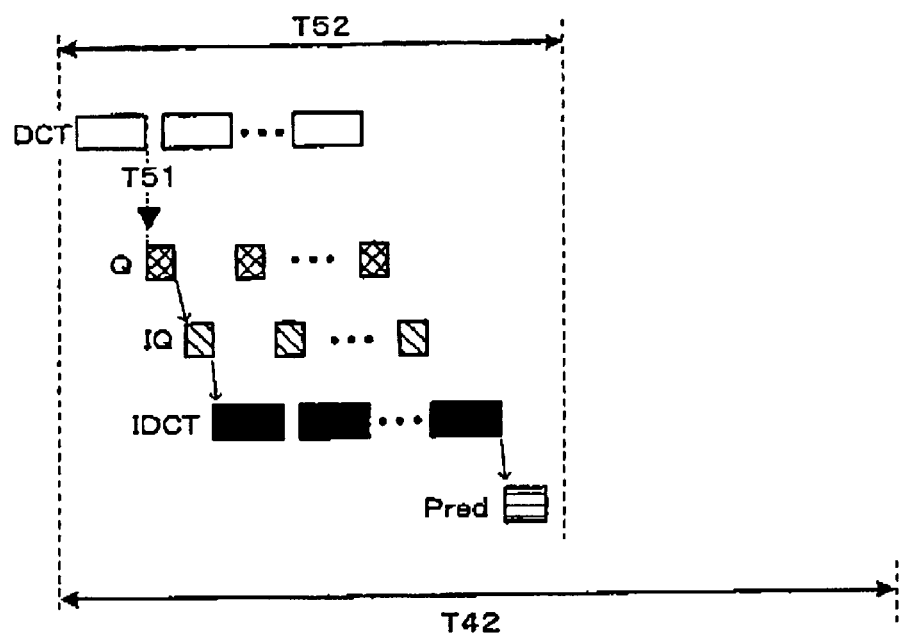
F I G. 2 0  Prior Art

SIGNAL PROCESSOR

REFERENCE TO RELATED APPLICATIONS

This application claims the foreign priority of Japanese Application No. 2006-060864, filed on Mar. 7, 2006.

BACKGROUND OF THE INVENTION

1. Field of the Invention

The present invention relates to a signal processor for data-compressing multi-value data representing a half tone image, a color image, and the like, more specifically to a technology for improving a processing efficiency by orthogonally transforming a unit region (block) of the image data as a compression algorithm of the image data and orthogonally transforming direct-current components with respect to a plurality of blocks in order to increase a compression efficiency.

2. Description of the Related Art

An image data representing a multi-value image, examples of which are an half tone image, a color image and the like, has an enormous volume of information. Therefore, it is necessary to compress the information volume when any of these image data is stored and transmitted. An example of an encoding method for compressing the information volume without destroying characteristics of the image data of the multi-value image, which is widely used, is a method in which DCT (Discrete Cosine Transform) as an orthogonal transform is used. Further, an encoding method in which a plurality of different orthogonal transforms is combined was invented in order to increase an encoding efficiency pursuant to the improvement of an image quality. In the encoding method called H.264/AVC, in particular, HAT (Hadamard Transform), which is an orthogonal transform, is combined with the discrete cosine transform so that the encoding efficiency is increased.

FIG. 15 shows a constitution of a signal processor in which the H.264/AVC encoding method is adopted. FIGS. 16A-16C and 17A-17C are illustrations of a concept of the signal processing. The signal processor comprises a discrete cosine transform unit 41, an Hadamard transform unit 42, a quantizing unit 43, an inverse Hadamard transform unit 44, an inverse quantizing unit 45, an inverse discrete cosine transform unit 46, an image predicting unit 47, and a predicted image error calculating unit 48.

An image to be encoded is divided into blocks of, for example, 4×4 pixels (see FIG. 16A), and a predicted image error data D0' corresponding to each of the blocks is generated in the predicted image error calculating unit 48 and supplied to the discrete cosine transform unit 41. The discrete cosine transform unit 41 executes a two-dimensional discrete cosine transform to the supplied predicted image error data D0' to thereby orthogonally transform the predicted image error data D0' of each block (see FIG. 16B). Then, a DCT coefficient data D1' representing a spatial frequency distribution of the images of the respective blocks is generated in the form of the matrix of four rows by four columns. The processing thereafter is described referring to a processing of a direct-current component and a processing of an alternate-current component.

Processing of Direct-Current Component

The discrete cosine transform unit 41 generates at once a DCT direct-current coefficient data D3' representing a direct-current component distribution of the images of a processing unit (MB (macro blocks): for example, eight blocks) from direct-current components D2' of the DCT coefficient data D1' (see FIG. 16C), and supplies the data D3' to the Hadamard transform unit 42. The Hadamard transform unit 42 executes a two-dimensional Hadamard transform to the supplied DCT discrete-current data D3' to thereby orthogonally transform the data D3' (see FIG. 17A). As a result, a HAT coefficient data D4' representing a spatial frequency distribution relating to the direct-current components of the images of the eight blocks is generated in the form of the matrix of two rows by four columns.

Processing of Alternate-Current Component

Of the DCT coefficient data D1', the alternate-current components except for the direct-current components D2' and the HAT coefficient data D4' are supplied to the quantizing unit 43. The quantizing unit 43 quantizes the alternate-current components of the supplied DCT coefficient data D1' and the HAT coefficient data D4' based on an appropriate quantizing step. The quantizing step is determined based on a result of a visual experiment in which a visual sensitivity with respect to each of the spatial frequencies is checked, and serves to minimize deterioration of a visual image quality and increase the encoding efficiency. Thereby, a post-quantizing DCT coefficient data d5' and a post-quantizing HAT coefficient data D5' are generated (see FIGS. 16B and 17A). These post-quantizing data are encoded.

Further, restoration of a quantizing result to the image data and feedback of the restored image data are necessary so that a quantizing error is not stored in other than signal processor. Therefore, the post-quantizing HAT coefficient data D5' is supplied to the inverse Hadamard transform unit 44. The inverse Hadamard transform 44 executes a two-dimensional inverse Hadamard transform to the supplied post-quantizing HAT coefficient data D5' to thereby orthogonally transform the data D5' (see FIG. 17A). As a result, a post-quantizing DCT direct-current coefficient data D6' corresponding to the direct-current components d4' of the post-quantizing DCT coefficient data d5' relating to the images of the eight blocks is obtained.

Next, the post-quantizing DCT direct-current coefficient data D6' is dissolved into direct-current components D7' of the respective eight blocks (sec FIG. 17B) and reflected on the direct-current components d4' of the post-quantizing DCT coefficient data d5', and then, the post-quantizing DCT coefficient data d5' is supplied to the inverse quantizing unit 45. The inverse quantizing unit 45 inversely quantizes the supplied data in order to obtain an original spatial frequency. The DCT coefficient data D1' representing the spatial frequency distribution of the images of the respective blocks is generated in the form of the matrix of four rows by four columns (see FIG. 16B).

Next, the DCT coefficient data D1' is supplied to the inverse discrete cosine transform unit 46. The inverse discrete cosine transform unit 46 executes a two-dimensional inverse discrete cosine transform to the supplied DCT coefficient data D1' to thereby orthogonally transform the DCT coefficient data D1' of each block. Thereby, the predicted image error data D0' of each block is generated (see FIG. 16B).

Finally, the predicted image error data D0' is supplied to the image predicting unit 47. The image predicting unit 47 supplies the generated predicted image to the predicted image error calculating unit 48. Then, the encoding process is completed.

The predicted image error data D0' thus generated shows a processing result which is the same as that of a decoding process. Therefore, the storage of the quantizing error can be prevented when the predicted image error data D0' is used as a reference image for the calculation of the predicted image error in the next encoding process.

As described, the spatial frequency distribution of the images of the respective blocks and the spatial frequency distribution relating to the direct-current components of the images of the plurality of blocks are quantized by means of the two different orthogonal transforms, which are the discrete cosine transform (DCT) and the Hadamard transform (HAT), as a result of which a high encoding efficiency can be realized.

However, the conventional encoding method has such a problem that a processing time until the encoding process is completed is increased. FIG. 18 shows the respective processings in chronological order. The discrete cosine transform (DCT), Hadamard transform (HAT), quantization (Q), inverse Hadamard transform (IHAT), inverse quantization (IQ), inverse discrete cosine transform (IDCT), and image prediction (Pred) are shown in chronological order in the drawing.

In order to execute the quantization (Q) after the Hadamard transform (HAT) is completed as described, the quantization starts at and after Timing T41, in which case a significantly large amount of time is necessary as a maximum allocation time T42 of one processing unit (MB).

FIG. 19 shows constitution of a data compressing device having the encoding efficiency lower than that of the device structure shown in FIG. 15 in which only the DCT is used. The data compressing device does not comprise the Hamadard transform unit and the inverse Hamadard transform unit. FIG. 20 shows the respective processings in chronological order in the data compressing device shown in FIG. 19. The discrete cosine transform (DCT), quantization (Q), inverse quantization (IQ), inverse discrete cosine transform (IDCT), and image prediction (Pred) are shown in chronological order in the drawing.

In the constitution of the data compressing device, the quantization starts at and after Timing T51 because the quantization (Q) is executed after the discrete cosine transform (DCT) is completed. In this case, the maximum allocation time T42 in the chronological operation shown in FIG. 18 is almost doubled in comparison to a maximum allocation time T52 in each processing unit (MB). The maximum allocation time T42 is thus increased because, with the Hamadard transform (HAT), a second orthogonal transform, added in the chronological operation shown in FIG. 18, the quantization (Q) cannot start unless the Hamadard transform is completed and the inverse Hadamard transform (IHAT) cannot start unless the quantization is completed.

In order to deal with such an inconvenience, it is necessary to increase a circuit operation frequency or parallelize the processings, which consequently invites increase of a chip area and increase of power consumption.

What matters most is the deterioration of the processing efficiency resulting from the inverse transform that has to be executed depending on the processing order when there are two orthogonal transforms, or the like, to be executed consecutively.

SUMMARY OF THE INVENTION

Therefore, a main object of the present invention is to prevent a performance from deteriorating by pursuing the improvement of a processing efficiency in a data compressing method in which two different orthogonal transforms are executed and a data processing method related thereto.

In order to achieve the foregoing object, a processing of an alternate-current component and a processing of a direct-current component in a spatial frequency distribution after an orthogonal transform is executed are separated in the present invention so that the alternate-current component and the direct-current component are processed independently from each other. As a result, dependency on the processing order, which is generated when an inverse transform is executed, can be dissolved.

A data compressing method according to the present invention includes:

a first step in which a data is orthogonally transformed so that an orthogonal transform data is generated; and a processing step executed subsequent to the first step, wherein the subsequent processing step includes a second step in which an inverse transform equivalent to a decoding process of the orthogonal transform data is executed to the orthogonal transform data, and the subsequent processing step is divided into a processing step for an alternate-current component of the orthogonal transform data and a processing step for a direct-current component of the orthogonal transform data.

The second step preferably includes an inverse orthogonal transform corresponding to the first step, and the inverse orthogonal transform is preferably an inverse orthogonal transform in which the direct-current component of the orthogonal transform data is zero.

Moreover, it is preferable that the present invention further includes a third step for orthogonally transforming the direct-current component of the orthogonal transform a data and the inverse orthogonal transform in the second step further includes the inverse orthogonal transform corresponding to the third step.

The data here can be an image data.

Examples of the orthogonal transform executed in the first step include a discrete cosine transform, a modified discrete cosine transform and the like. Examples of the orthogonal transform executed in the third step include a Hadamard transform, a second discrete cosine transform, a wavelet transform and the like. The inverse orthogonal transform executed in the second step corresponding to the first step is an inverse discrete cosine transform or the like. The inverse orthogonal transform executed in the second step corresponding to the third step is an inverse Hadamard transform or the like.

According to the present invention, when an orthogonal transform, or the like, is executed after another orthogonal transform is executed, the processing step subsequent to the first step (orthogonal transform) is divided into the processing of the alternate-current component and the processing of the direct-current component so that each processing can be independently executed. As a result, the dependency on the processing order, which is generated when the inverse transform is executed, can be dissolved, which improves a processing efficiency and prevents performance deterioration.

The transform of the direct-current component obtained in the orthogonal transform is preferably also the orthogonal transform, and the orthogonal transform is executed in a third step. Then, the inverse orthogonal transform executed in the second step preferably further includes an inverse orthogonal transform corresponding to the third step.

A data compressing method according to the present invention includes:

a first step in which a data is orthogonally transformed so that a first orthogonal transform data is generated; and a processing step executed subsequent to the first step, wherein the subsequent processing step includes a second step in which an inverse transform equivalent to a decoding process of the first orthogonal transform is executed to the first orthogonal transform data and a third step in which a direct-current component of the first orthogonal transform data is orthogonally transformed so that a second orthogonal transform data is generated, the subsequent processing step is divided into a processing step for an alternate-current component of the first orthogonal transform data and a processing step for the direct-current component of the first orthogonal transform data.

The second step preferably includes a first inverse orthogonal transform corresponding to the first step and a second inverse orthogonal transform corresponding to the third step. Further, it is preferable that the direct-current component of the first orthogonal transform data be a first value, and a difference between the first value and a second value obtained from an inverse matrix of a second inverse orthogonal transform data be added to elements of an inverse matrix of a first inverse orthogonal transform data in the first inverse orthogonal transform.

In the foregoing constitution, the data compressing method preferably further includes a fourth step in which the alternate-current component and the direct-current component of the first orthogonal transform data are quantized, and a fifth step in which data obtained in the quantization in the fourth step is inversely quantized.

In the foregoing constitution, the fourth step and the fifth step are preferably executed in a time-sharing manner. Further, the first step, the second step and the third step are preferably executed in a time-sharing manner.

It is unnecessary to execute the quantization and the inverse quantization in blocks independent from each other, and the effect of the present invention can still be exerted when, for example, the quantization and the inverse quantization are executed in the time-sharing manner in a common block. When the processings are thus executed in the common block, a circuit area and power consumption can be effectively reduced.

According to still another preferable mode of the foregoing constitution, the data is an image data, the orthogonal transform executed in the first step is a discrete cosine transform, the orthogonal transform executed in the third step is Hadamard transform, the processing of the second step corresponding to the first step is an inverse discrete cosine transform, and the processing of the second step corresponding to the third step is inverse Hadamard transform.

According to still another preferable mode of the foregoing constitution, the orthogonal transform executed in the third step and the second inverse orthogonal transform can be selected from a plurality of different orthogonal transforms and inverse orthogonal transforms corresponding thereto, and an arbitrary processing is selected from the plurality of orthogonal transforms and the inverse orthogonal transforms corresponding thereto based on a result of the transform executed in the first step.

Examples of the orthogonal transform include a few types of transforms such as the discrete cosine transform and Hadamard transform, which are respectively have advantages and disadvantages. In general, the Hadamard transform can be realized with simple adding and subtracting calculations, while the discrete cosine transform can realize an orthogonal transform which is suitable for the compression. Which of the orthogonal transforms is suitable is judged based on the transform result obtained in the first step so that a trade-off relationship generated between a processing volume and an encoding efficiency can be dissolved.

According to still another preferable mode of the foregoing constitution, the data is an image data, the quantization of the direct-current component executed in the fourth step is the quantization of the direct-current component of luminance or color-different information of the image, and a quantizing step in the quantization is decided based on a result of the transform executed in the second step.

According to still another preferable mode of the foregoing constitution, the data is an audio data, a step in which the direct-current component is transformed is further provided, and the step executes a parameter transform for deciding an image quality or a sound quality of the image data or the audio data.

According to still another preferable mode of the foregoing constitution, the data is an image data, a third step in which the direct-current component of the orthogonal transform data is orthogonally transformed is further included, the second step further includes an inverse orthogonal transform corresponding to the third step, the parameter transform is such a transform that includes a maximum value or a minimum value of the direct-current component of the luminance or color-different information of the image in a desirable range, and the desirable range is decided based on a result of the transform executed in the third step.

According to still another preferable mode of the foregoing constitution, the data is an audio data, the orthogonal transform executed in the first step is a modified discrete cosine transform, the inverse orthogonal transform executed in the second step corresponding to the first step is a modified inverse discrete cosine transform, the orthogonal transform executed in the third step is a wavelet transform, and the inverse orthogonal transform executed in the second step corresponding to the third step is an inverse wavelet transform.

According to still another preferable mode of the foregoing constitution, the data is an audio data, the quantization of the direct-current component in the fourth step is quantization with respect to an audio amplitude level, and a quantizing step in the quantization is decided based on a result of the transform executed in the third step.

According to still another preferable mode of the foregoing constitution, the data is an audio data, a third step in which the direct-current component of the orthogonal transform data is orthogonally transformed is further included, the second step further includes an inverse orthogonal transform corresponding to the third step, the parameter transform is such a transform that includes a maximum value or a minimum value of the direct-current component of the audio amplitude level in a desirable range, and the desirable range is decided based on a result of the transform executed in the third step. Accordingly, the amplitude is restricted so that a dynamic range resulting from the direct-current component cannot exceed a specified value.

According to still another preferable mode of the foregoing constitution, the data is an image data, a third step in which the direct-current component of the orthogonal transform data is orthogonally transformed is further included, the second step further includes an inverse orthogonal transform corresponding to the third step, the parameter transform is such a transform that uses an average value of the direct-current components of a plurality of luminance informations as the direct-current component of the luminance or color-difference information of the image, and the average value is decided based on a result of the transform executed in the third step.

According to still another preferable mode of the foregoing constitution, the data is an audio data, a third step in which the direct-current component of the orthogonal transform data is orthogonally transformed is further included, the second step further includes an inverse orthogonal transform corresponding to the third step, the parameter transform is such a transform that uses an average value of the direct-current components of a plurality of audio amplitude levels as the direct-current component of the audio amplitude level, and the average value is decided based on a result of the transform executed in the third step. Accordingly, a variation of the direct-current component can be reduced.

According to still another preferable mode of the foregoing constitution, the data is an image data, a third step in which the direct-current component of the orthogonal transform data is orthogonally transformed is further included, the second step further includes an inverse orthogonal transform corresponding to the third step, the parameter transform is a process in which high-frequency components are eliminated from spatial frequency components of the direct-current components of a plurality of luminance or color-difference information on the image, and a degree of the elimination in the high-frequency component eliminating process is decided based on a result of the transform executed in the third step. Accordingly, the direct-current component is prevented from drastically changing since the high-frequency component is eliminated.

According to still another preferable mode of the foregoing constitution, the data is an audio data, a third step in which the direct-current component of the orthogonal transform data is orthogonally transformed is further included, the second step further includes an inverse orthogonal transform corresponding to the third step, the parameter transform is a process in which a high-frequency component is eliminated from a spatial frequency component of the direct-current component of an audio amplitude level, and a degree of the elimination in the high-frequency component eliminating process is decided based on a result of the transform executed in the third step. Accordingly, the direct-current component is prevented from drastically changing since the high-frequency component is eliminated.

According to still another preferable mode of the foregoing constitution, the data is an image data, a third step in which the direct-current component of the orthogonal transform data is orthogonally transformed is further included, the second step further includes an inverse orthogonal transform corresponding to the third step, the parameter transform is such a transform that sets the direct-current component of luminance or color-difference information on the image within the range where high-efficiency encoding is attainable, and the high-efficiency encoding range in the transform process is decided based on the result of the transform executed in the third step.

According to still another preferable mode of the foregoing constitution, the data is an audio data, a third step in which the direct-current component of the orthogonal transform data is orthogonally transformed is further included, the second step further includes an inverse orthogonal transform corresponding to the third step, the parameter transform is such a transform that sets the direct-current component of an audio amplitude level within the range where high-efficiency encoding is attainable, and the high-efficiency encoding range in the transform process is decided based on the result of the transform executed in the third step.

The present invention so far described is effectively applied to a communication device, an information reproducing device, an image display device, an electronic device, and the like.

According to the present invention, when an orthogonal transform, or the like, is executed after another orthogonal transform is executed, the processing step subsequent to the first step is divided into the processing step for the alternate-current component and the processing step for the direct-current component so that the respective processings are independently executed. As a result, the dependency on the processing order induced by the inverse transform can be dissolved, the processing efficiency can be increased, and the performance deterioration can be prevented.

The present invention, capable of increasing the processing efficiency and preventing the performance deterioration, can be applied for uses that demand reduction of power consumption, higher image quality and higher audio quality.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIGS. 2A-2B are (first) illustrations of a processing concept in a data compressing method according to the preferred embodiment 1.

FIG. 4 is an illustration of processings in chronological order in the signal processor according to the preferred embodiment 1.

FIG. 5 is an illustration of a processing time per frame in the data compressing method according to the preferred embodiment 1 executed based on the H.264/AVC encoding method.

FIGS. 9A-9B are (first) conceptual views of parameter adjustment in a data compressing method according to the preferred embodiment 3.

FIGS. 10A-10B are (second) conceptual views of the parameter adjustment in the data compressing method according to the preferred embodiment 3.

FIG. 13 is an illustration of processings in chronological order in the signal processor according to the preferred embodiment 4.

FIGS. 14A-14D are schematic views of various devices comprising the signal processor according to the present invention.

FIGS. 16A-16C are (first) illustrations of a processing concept in the conventional signal processor.

FIGS. 17A and 17B are (second) illustrations of the processing concept in the conventional signal processor.

FIG. 18 is an illustration of processings in chronological order in the conventional signal processor.

FIG. 19 is a block diagram illustrating a constitution of another conventional signal processor (data compressing device).

FIG. 20 is an illustration of processings in chronological order in the another conventional signal processor.

DETAILED DESCRIPTION OF THE INVENTION

Figure 1:
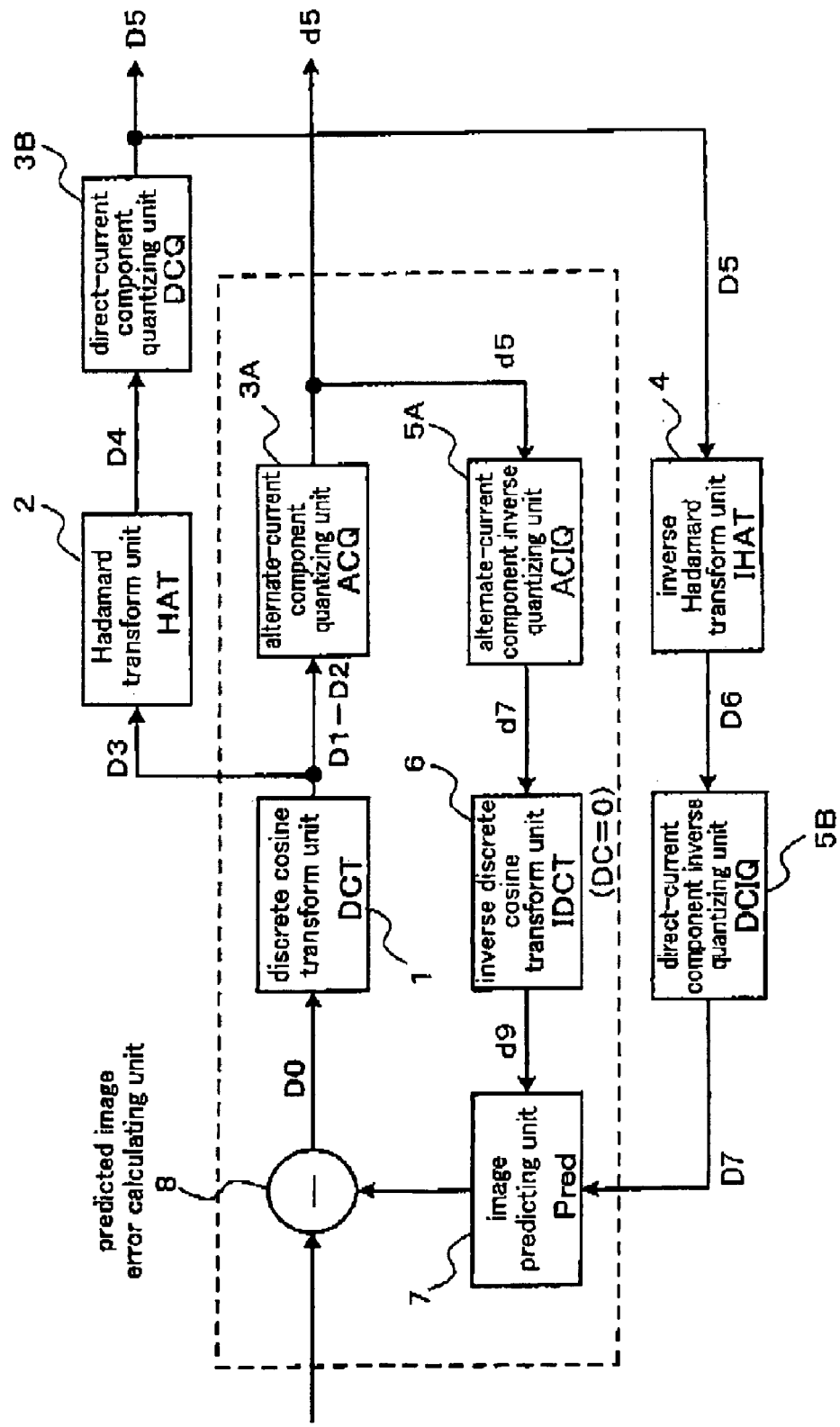
FIG. 1 is a block diagram illustrating a constitution of a signal processor (data compressing device) according to a preferred embodiment 1 of the present invention.

Hereinafter, preferred embodiments of the present invention are described referring to the drawings.

Preferred Embodiment 1

FIG. 1 is a block diagram illustrating a constitution of a signal processor (data compressing device) according to a preferred embodiment 1 of the present invention. The signal processor according to the present preferred embodiment comprises a discrete cosine transform unit 1, an Hadamard transform unit 2, an alternate-current component quantizing unit 3A, a direct-current component quantizing unit 3B, an inverse Hadamard transform unit 4, an alternate-current component inverse quantizing unit 5A, a direct-current component inverse quantizing unit 5B, an inverse discrete cosine transform unit 6, an image predicting unit 7, and a predicted image error calculating unit 8.

A subsequent stage of the discrete cosine transform unit 1 is divided into an alternate-current processing system and a direct-current processing system. The alternate-current processing system comprises the chronological components, which are the alternate-current component quantizing unit 3A, alternate-current component inverse quantizing unit 5A, and inverse discrete cosine transform unit 6. The direct-current processing system comprises the chronological components, which are the Hadamard transform unit 2, direct-current component quantizing unit 3B, inverse Hadamard transform unit 4, and direct-current component inverse quantizing unit 5B. An output of the inverse discrete cosine transform unit 6 and an output of the direct-current component inverse quantizing unit 5B are supplied to the image predicting unit 7, and an output of the image predicting unit 7 is supplied to the predicted image error calculating unit 8.

An operation in the constitution shown in FIG. 1 is schematically described. A predicted image error data D0 is supplied from the predicted image error calculating unit 8 to the discrete cosine transform unit 1. The discrete cosine transform unit 1 orthogonally transforms the predicted image error data D0 by means of a two-dimensional discrete cosine transform to thereby generate a DCT coefficient data D1. The DCT coefficient data D1 is divided into the two system.

The operations of the respective components in the subsequent stage of the discrete cosine transform unit 1 start in the following order.

1) alternate-current component quantizing unit (ACQ) 3A
2) alternate-current component inverse quantizing unit (ACIQ) 5A
3) inverse discrete cosine transform unit (IDCT) 6
4) Hadamard transform unit (HAT) 2
5) direct-current component quantizing unit (DCQ) 3B
6) inverse Hadamard transform unit (IHAT) 4
7) direct-current component inverse quantizing unit (DCIQ) 5B Operation of Alternate-Current Processing System An alternate-current component obtained by subtracting a direct-current component D2 from the DCT coefficient data D1 (D1-D2) outputted from the discrete cosine transform unit 1 is supplied to the alternate-current component quantizing unit 3A. The alternate-current component quantizing unit 3A quantizes the alternate-current component (D1-D2) to thereby generate a post-quantizing DCT coefficient data d5. The post-quantizing DCT coefficient data d5 is transmitted to the subsequent stage and encoded therein.

Further, the post-quantizing DCT coefficient data d5 is supplied to a feedback system for preventing storage of a quantizing error, in other words, the post-quantizing DCT coefficient data d5 is supplied to the alternate-current component inverse quantizing unit 5A. The alternate-current component inverse quantizing unit 5A inversely quantizes the post-quantizing DCT coefficient data d5 to thereby generate a post-inverse-quantizing DCT alternate-current coefficient data d7, and supplies the generated data d7 to the inverse discrete cosine transform unit 6. The inverse discrete cosine transform unit 6 orthogonally transforms the post-inverse-quantizing DCT alternate-current coefficient data d7 by means of a two-dimensional inverse discrete cosine transform to thereby generate an alternate-current component predicted image error data d9. The alternate-current component predicted image error data d9 is supplied to the image predicting unit 7. In the inverse discrete cosine transform unit 6, the direct-current component is zero (DC=0).

Operation of Direct-Current Processing System

The direct-current components D2 retrieved from the DCT coefficient data D1 are collectively supplied to the Hadamard transform unit 2. The data supplied to the Hadamard transform unit 2 thus has a direct-current component distribution, and the relevant data is hereinafter called a DCT direct-current coefficient data D3. The Hadamard transform unit 2 orthogonally transforms the DCT direct-current coefficient data D3 by means of a two-dimensional Hadamard transform to thereby generate a HAT coefficient data D4. The HAT coefficient data D4 has a spatial frequency distribution relating to the direct-current components. The HAT coefficient data D4 is supplied to the direct-current component quantizing unit 3B. The direct-current component quantizing unit 3B quantizes the HAT coefficient data D4 to thereby generate a post-quantizing HAT coefficient data D5. The post-quantizing HAT coefficient data D5 is transmitted to the subsequent stage and encoded therein.

The post-quantizing HAT coefficient data D5 is supplied to the feedback system for preventing the storage of the quantizing error. In other words, post-quantizing HAT coefficient data D5 is supplied to the inverse Hadamard transform unit 4 and orthogonally transformed by means of a two-dimensional inverse Hadamard transform. A post-quantizing DCT direct-current coefficient data D6 is thereby generated. The post-quantizing DCT direct-current coefficient data D6 corresponds to a direct-current component d4 of the post-quantizing DCT coefficient data d5. The post-quantizing DCT direct-current coefficient data D6 is supplied to the direct-current component inverse quantizing unit 5B. The direct-current component inverse quantizing unit 5B inversely quantizes the post-quantizing DCT direct-current coefficient data D6 to thereby generate a post-inverse-quantizing DCT direct-current coefficient data D7. The post-inverse-quantizing DCT direct-current coefficient data D7 corresponds to the direct-current component D2 of the DCT coefficient data D1. The post-inverse-quantizing DCT direct-current coefficient data D7 is supplied to the image predicting unit 7.

The image predicting unit 7 generates a reference image for the calculation of the predicted image error from the post-inverse-quantizing DCT direct-current coefficient data D7 and the alternate-current component predicted image error data d9, and supplies the generated reference image to the predicted image error calculating unit 8. The reference image is equivalent to a predicted image error data D0'. The predicted image error calculating unit 8 prevents the storage of the quantizing error based on the supplied reference image.

The operation is more specifically described. As shown in FIG. 2A, an image to be encoded is divided into blocks of 4×4 pixels. The predicted image error calculating unit 8 generates the predicted image error data D0 corresponding to each of these blocks and supplies the generated data D0 to the discrete cosine transform unit 1. As shown in FIG. 2A, the discrete cosine transform unit 1 executes the two-dimensional discrete cosine transform to the predicted image error data D0 to thereby orthogonally transform the predicted image error data D0 of the respective blocks. Thereby, the DCT coefficient data D1 representing the spatial frequency distribution of the images of the respective blocks is generated in the form of the matrix of four rows by four columns.

Operation of Alternate-Current Processing System

Next, the alternate-current component obtained by subtracting the direct-current component D2 from the DCT coefficient data D1 (D1-D2) is supplied to the alternate-current component quantizing unit 3A. The alternate-current component quantizing unit 3A quantizes the alternate-current component (D1-D2) based on an appropriate quantizing step to thereby generate the post-quantizing DCT coefficient data d5 as shown in FIG. 2B. As described earlier, the quantizing step is set based on the visual experiment result showing the visual sensitivity which is checked with respect to each of the spatial frequencies. In the post-quantizing DCT coefficient data d5, a visual deterioration of the image is reduced to a minimum level so that an encoding efficiency is increased. The post-quantizing DCT coefficient data d5 is transmitted to the subsequent stage and encoded therein.

Further, the encoding process described earlier is executed to the quantizing result, and the quantizing result is restored to the image data and a feedback processing is executed thereto. The post-quantizing DCT coefficient data d5 is supplied to the alternate-current component inverse quantizing unit 5A in order to prevent the storage of the quantizing error. The alternate-current component inverse quantizing unit 5A inversely quantizes the post-quantizing DCT coefficient data d5 based on the quantizing step described earlier in order to obtain an original spatial frequency so that an element d6 corresponding to the direct-current component is zero. Thereby, the alternate-current component inverse quantizing unit 5A generates the post-inverse-quantizing DCT alternate-current coefficient data d7 representing the spatial frequency distribution of the images of the respective blocks in the form of the matrix of four rows by four columns.

Next, the post-inverse-quantizing DCT alternate-current coefficient data d7 is supplied to the inverse discrete cosine transform unit 6. The inverse discrete cosine transform unit 6 executes the two-dimensional inverse discrete cosine transform to the post-inverse-quantizing DCT alternate-current coefficient data d7 to thereby orthogonally transform the post-inverse-quantizing DCT alternate-current coefficient data d7 of the respective blocks. Thereby, the alternate-current component predicted image error data d9 of the respective blocks is generated and supplied to the image predicting unit 7.

Operation of Direct-Current Processing System

Figure 3A:
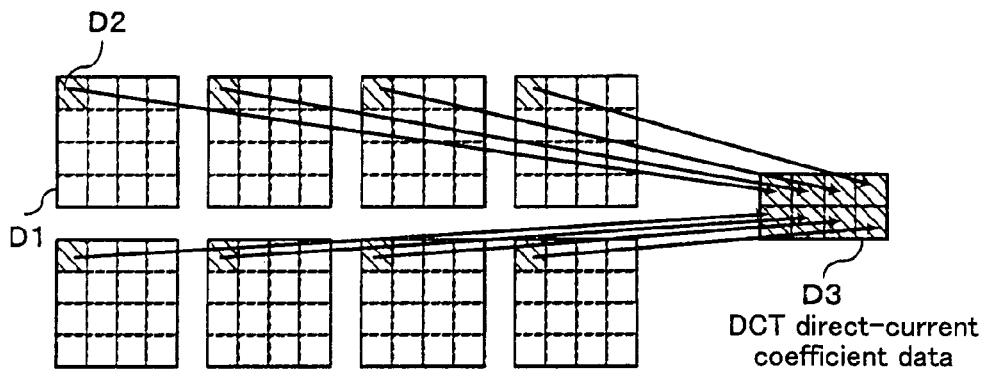
FIGS. 3A-3C are (second) illustrations of the processing concept in the data compressing method according to the preferred embodiment 1.
Figure 3B:
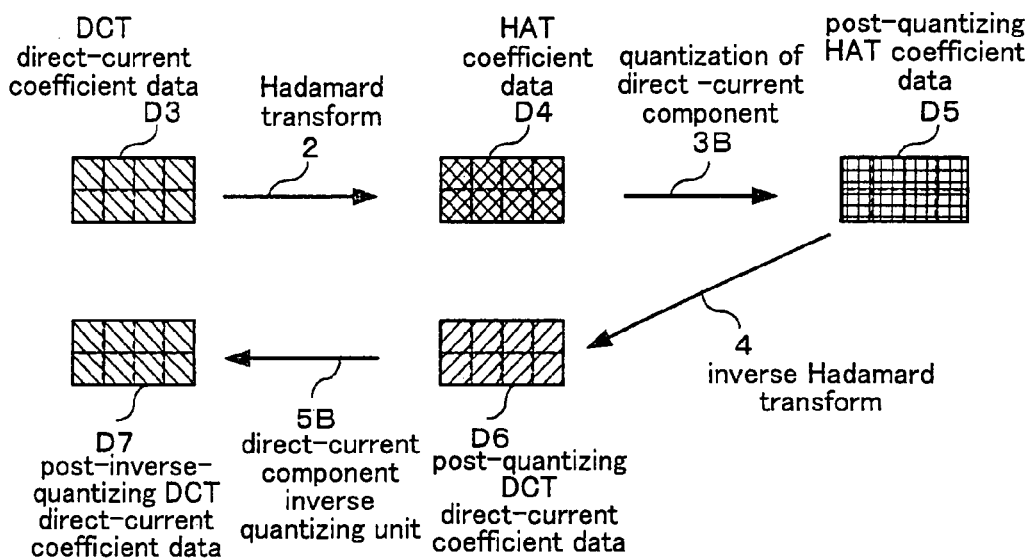

As shown in FIG. 3A, the discrete cosine transform unit 1 collects the direct-current component D2 included in the DCT coefficient data D1 by one processing unit (MB: for example, eight blocks) to thereby generate the DCT direct-current coefficient data D3 representing the direct-current component distribution of the images corresponding to the processing unit. The generated DCT direct-current coefficient data D3 is supplied to the Hadamard transform unit 2. The Hadamard transform unit 2 orthogonally transforms the DCT direct-current coefficient data D3 by means of the two-dimensional Hadamard transform as shown in FIG. 3B. Thereby, the HAT coefficient data D4 representing the spatial frequency distribution relating to the images corresponding to the processing unit is generated. The HAT coefficient data D4 is generated in the form of the matrix of two rows by four columns. The HAT coefficient data D4 is supplied to the direct-current component quantizing unit 3B. The direct-current component quantizing unit 3B quantizes the alternate-current component of the DCT coefficient data D1 and the HAT coefficient data D4 based on an appropriate quantizing step to thereby generate the post-quantizing HAT coefficient data D5. As described earlier, the quantizing step is set based on the visual experiment result showing the visual sensitivity which is checked with respect to each of the spatial frequencies. When this step is implemented, the visual deterioration of the image is minimized so that the encoding efficiency is increased in the post-quantizing HAT coefficient data D5. The quantizing step may be decided so that the visual deterioration of the image is further reduced based on the spatial frequency distribution relating to the direct-current components of the images of the eight blocks (obtained from the value of the HAT coefficient data D4). As a result, the encoding efficiency can be further increased.

Next, the post-quantizing HAT coefficient data D5 is supplied to the inverse Hadamard transform unit 4. The inverse Hadamard transform unit 4 orthogonally transforms the post-quantizing HAT coefficient data D5 by means of the two-dimensional inverse Hadamard transform. As a result, the post-quantizing DCT direct-current coefficient data D6 corresponding to the direct-current components d4 of the post-quantizing DCT coefficient data d5 relating to the images of the eight blocks can be obtained.

Next, the post-quantizing DCT direct-current coefficient data D6 is supplied to the direct-current component inverse quantizing unit 5B. The direct-current component inverse quantizing unit 5B inversely quantizes the post-quantizing DCT direct-current coefficient data D6 in order to obtain an original spatial frequency based on the quantizing step described earlier. As a result, the post-inverse-quantizing DCT direct-current coefficient data D7 corresponding to the direct-current components of the DCT coefficient data relating to the images of the respective blocks is generated.

Figure 3C:
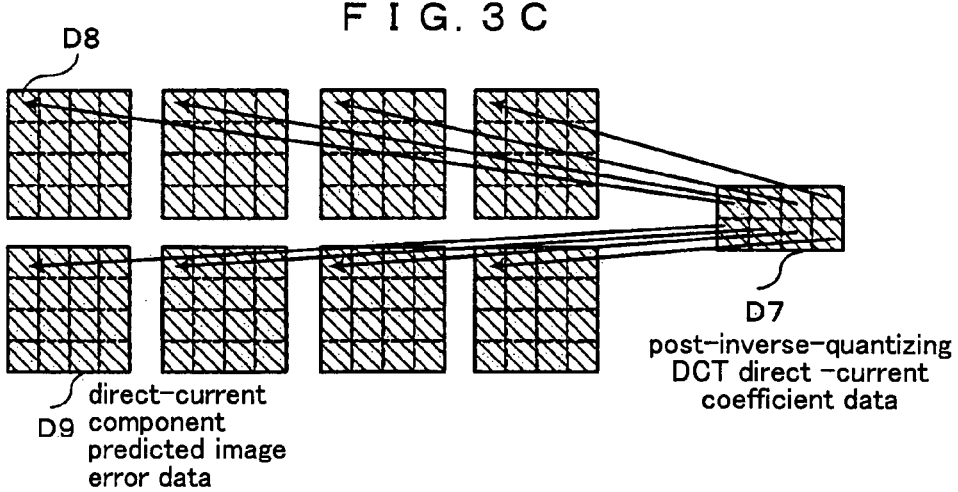

Next, as shown in FIG. 3C, the direct-current component inverse quantizing unit 5B dissolves the post-inverse-quantizing DCT direct-current coefficient data D7 into direct-current components 8 of the processing unit (for example, eight blocks) to thereby generate the matrix of four rows by four columns in which all of the elements shows a value equal to that of the direct-current component D8. Because the direct-current component in the spatial frequency corresponds to a bias component in the predicted image error data, the generated matrix is equal to a direct-current component predicted image error data D9 of each of the blocks. The direct-current component predicted image error data D9 corresponds to a difference obtained by subtracting the alternate-current component predicted image error data d9 from the predicted image error data D0.

Finally, the alternate-current component predicted image error data d9 by the inverse discrete cosine transform unit 6 and the direct-current component predicted image error data D9 by the direct-current component inverse quantizing unit 5B are supplied to the image predicting unit 7. The image predicting unit 7 supplies a predicted image generated based on the data d9 and D9 to the predicted image error calculating unit 8. Then, the encoding process is completed.

The sum of the alternate-current component predicted image error data d9 and the direct-current component predicted image error data D9 thus generated is equivalent to the predicted image error data D0' mathematically obtained by means of a conventional method. Therefore, the sum is equal to a processing result obtained in consequence of the decoding process in a manner similar to the conventional method. When the sum is used for the reference image for the calculation of the predicted image in the next encoding process, the storage of the quantizing error can be prevented.

As described, the spatial frequency distribution of the images of the respective blocks and the spatial frequency distribution relating to the direct-current components of the images of the plurality of blocks are quantized, wherein the two different orthogonal transforms, which are the discrete cosine transform (DCT) and the Hadamard transform (HAT), are adopted. As a result, the encoding efficiency thereby achieved is high.

Further, after being processed at the discrete cosine transform unit 1, the alternate-current component and the direct-current component are separated and then independently processed. Therefore, the dependency on the processing order induced by the inverse transform, which is seen in the conventional method, can be dissolved.

FIG. 4 shows processings in chronological order. The discrete cosine transform (DCT), alternate-current component quantization (ACQ), alternate-current component inverse quantization (ACIQ), inverse discrete cosine transform (IDCT), Hadamard transform (HAT), direct-current component quantization (DCQ), inverse Hadamard transform (IHAT), direct-current component inverse quantization (DCIQ), and image prediction (Pred) are shown in chronological order in the drawing.

As shown in FIG. 4, in the present preferred embodiment, the alternate-current component quantization (ACQ) is implemented after the discrete cosine transform (DCT) is completed. Therefore, the alternate-current component quantization (ACQ) starts at and after Timing T1, and then, the alternate-current component inverse quantization (ACIQ) and the inverse discrete cosine transform (IDCT) which follow in the order sequentially start.

Further, the processing of the alternate-current component can be precedently executed during a period before the processing of one processing unit (MB) is completed because the Hadamard transform (HAT) starts in parallel with the discrete cosine transform (DCT) with respect to the last block of one processing unit (MB). Then, the direct-current component quantization (DCQ) starts at and after Timing T2 because the direct-current component quantization (DCQ) is implemented after the Hadamard transform (HAT) is completed.

A maximum allocation time T3 of one processing unit (MB) in this case is reduced to approximately a half of the processing time T42 in the conventional method, which shows the processing efficiency is improved. For example, the following effects can be obtained by the improvement of the processing efficiency. In some cases, it is only necessary for the processings to be completed within the processing time T42 in the conventional method in view of the standards of the encoding method. In those cases, the power consumption can be reduced when an operation frequency of the processing circuit is reduced substantially in half, or the encoding efficiency can be further increased by an additional processing for improving the image quality during the remaining processing time.

The orthogonal transform is not limited to the discrete cosine transform and the Hadamard transform. The present invention is still effective when the orthogonal transform, such as a wavelet transform (WT) or a modified discrete cosine transform (MDCT), is adopted.

Further, it is unnecessary for the quantization and the inverse quantization shown in FIG. 4 to be executed in separate blocks. The effect of the present invention can still be exerted when the quantization and the inverse quantization are executed in the common block in a time-sharing manner. The time-sharing execution can be applied in a similar manner to the discrete cosine transform (DCT) and the inverse discrete cosine transform (IDCT), or the Hadamard transform (HAT) and the inverse Hadamard transform (IHAT). The common processing block described above makes it possible for circuit size and power consumption to be reduced.

The following is a concrete example of the H.264/AVC encoding LSI specifications and the effect thereby obtained according to the present invention. From the perspective of parallelizing the process, circuit size and parallelization forms that are realizable will be schematically described in view of the possibility of the parallelization and the difference made by the circuit size.

In the case where the processings are parallelized in the entire H.264/AVC encoding processing, for example, a luminance component and a color-difference component, which are the image components orthogonal to each other, are desirably parallelized. Due to the presence of multiplication/shift in the calculation process of the quantization and the inverse quantization, a desirable processing in the luminance component is at such a level that the respective rows or columns of the 8×8 pixels are parallelized (parallelization of eight rows or columns), and a desirable processing in the color-difference component is at such a level that the respective rows or columns of the 4×4 pixels are parallelized (parallelization of four rows or columns). In the case of the parallelization in each processing unit (MB), the parallelization is not preferable because it is necessary to memorize the elements in the rows and columns in the orthogonal transform.

The circuit size of the encoding LSI in which the parallelization is realized based on the foregoing viewpoints is approximately 4,000,000 transistors. Meanwhile, in the case where an increasing number of the orthogonal transform and the quantization are executed, memory circuits and operators such as memories and registers need to be added, meaning more transistors required. Specifically, one additional parallel requires about 10% more transistors. The increased number of transistors affects the chip area, leading to deterioration of a yielding rate. Therefore, a realistic circuit size is at most 40,000,000 transistors.

Next is described the operation frequency of the LSI as a minimum requirement in the case where a necessary number of cycles and an image size and a frame rate to be targeted per processing unit based on the form of parallelization described above are defined. In an image mode where the processing volume in the H.264/AVC encoding is maximized, for example, the image size is 1920×1080, and the frame rate is 30 Hz. The number of the processing units (MB) in one screen in this mode is 8160. A necessary number of cycles T3 in the processing unit (MB) is suitably approximately 288 cycles based on the foregoing form of parallelization. As shown in FIG. 5, one image unit (frame) includes a plurality of processing units (MB). Therefore, a necessary number of cycles T4 per image unit (frame) is 8160×288=2350080 cycles. Because the frame rate is 30 Hz, the operation frequency which is required in the LSI for the encoding process is 2350080×30=70.5 MHz.

Figure 15:
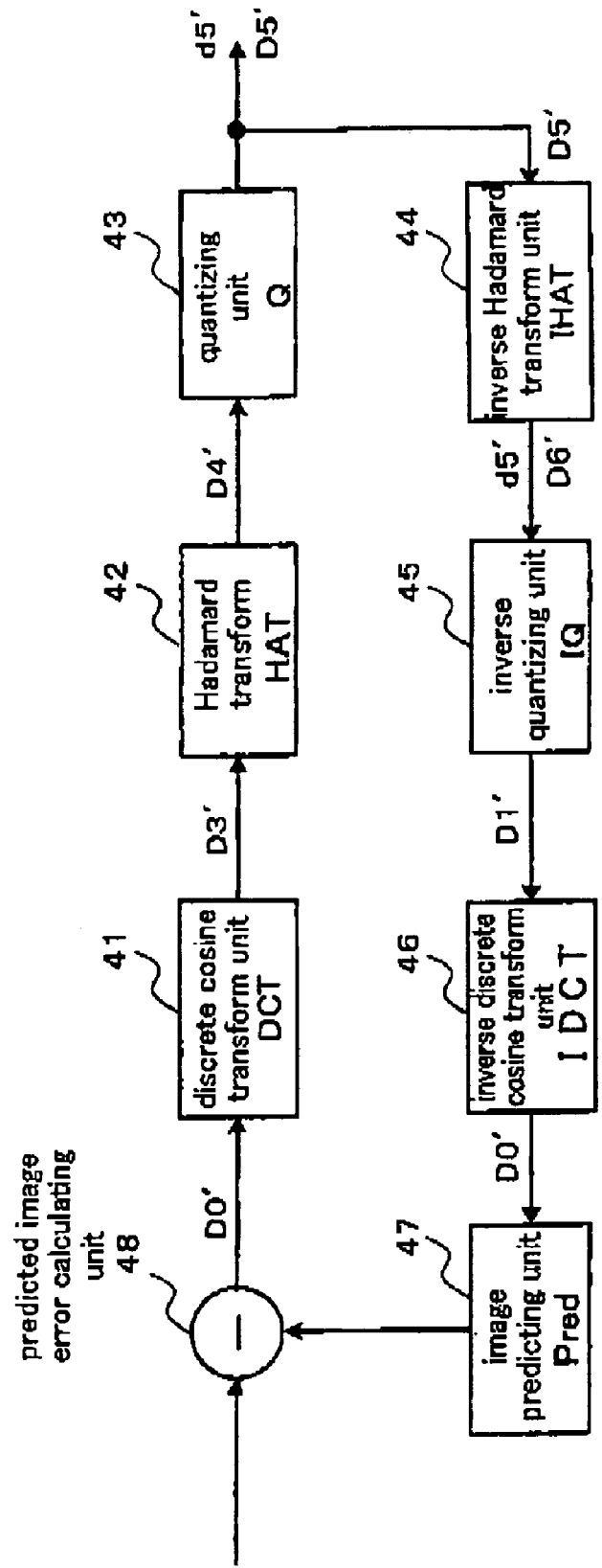
FIG. 15 is a block diagram illustrating a constitution of a conventional signal processor (data compressing device).

The number of the cycles in the processing unit up to Timing T2 when the Hadamard transform (HAT) is completed is approximately 230 cycles. Further, the number of the cycles from the quantization through the image prediction based on the foregoing form of parallelization is approximately 230 cycles. Therefore, in the LSI provided with the conventional encoding device shown in FIG. 15, for example, the necessary number of the cycles T42 in the processing unit (MB) is approximately 288+230=518 cycles. The necessary number of the cycles per image unit (frame) is approximately 8160×518=4226880 cycles. Because the frame rate in this case is also 30 Hz, the operation frequency required in the LSI is 4226880×30=126.8 MHz.

Based on the foregoing description, when the form of parallelization (circuit area of at most 40,000,000 transistors) is adopted in the LSI provided with the H.264/AVC encoding device (signal processor), it is difficult to process the image mode having the operation frequency below 100 MHz, the image size of 1920×1080, and the frame rate of 30 Hz in the constitution wherein the present invention is not applied, while the relevant image mode can be processed at the operation frequency below 100 MHz in the constitution wherein the present invention is applied.

Preferred Embodiment 2

It is unnecessary to limit the orthogonal transform with respect to the direct-current component to the Hadamard transform. In a preferred embodiment 2 of the present invention, one of the Hadamard transform and the discrete cosine transform is selected as the orthogonal transform with respect to the direct-current component.

Figure 6:
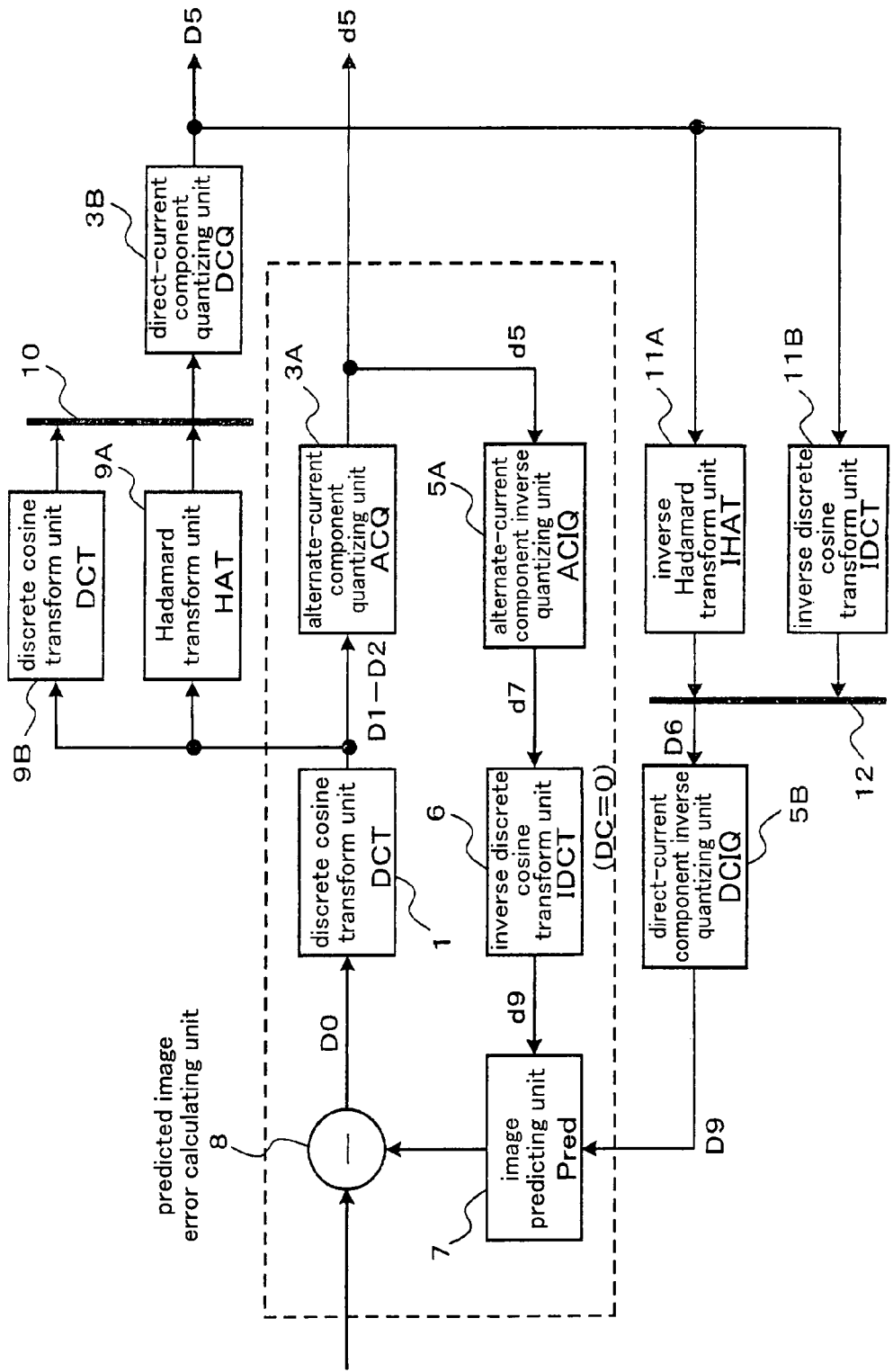
FIG. 6 is a block diagram illustrating a constitution of a signal processor (data compressing device) according to a preferred embodiment 2 of the present invention.

FIG. 6 is a block diagram illustrating a constitution of a signal processor (data compressing device) according to the preferred embodiment 2. In FIG. 6, the same reference symbols as those shown in FIG. 1 according to the preferred embodiment 1 show the same components. The constitution according to the present preferred embodiment is characterized in that an Hadamard transform unit 9A and a discrete cosine transform unit 9B are connected in parallel in the subsequent stage of the discrete cosine transform unit 1, and outputs of these components are selected in a selector 10 and supplied to the direct-current component quantizing unit 3B. An inverse Hadamard transform unit 11A and an inverse discrete cosine transform unit 11B are connected in parallel to the output of the direct-current component quantizing unit 3B, and outputs of these components are selected in a selector 12 and supplied to the direct-current component inverse quantizing unit 5B.

In the foregoing constitution, it is judged which of the Hadamard transform and the discrete cosine transform is preferably selected as the orthogonal transform with respect to the direct-current component transform based on the processing result of the discrete cosine transform unit 1, and the selectors 10 and 12 are controlled based on a result of the judgment. Any other part of the constitution is similar to that of the preferred embodiment 1, and not described again.

Referring to advantages of the respective orthogonal transforms generally recognized, simple addition and subtraction can realize the Hadamard transform, while the discrete cosine transform can realized the orthogonal transform which is the most suitable for the compression. In the present preferred embodiment, it is judged which of the orthogonal transform is suitable based on the processing result of the discrete cosine transform, and one of the Hadamard transform and the discrete cosine transform is selected based on the judgment result. As a result, trade-off between the processing volume and the encoding efficiency, which is generated in the executed encoding method, can be dissolved. The judgment is made, for example, as follows. In the case where 0 is often detected in a high-frequency component after the processing at the discrete cosine transform unit 1, it is predicted that a spatial change in the direct-current component is small. Therefore, the Hadamard transform can realize the compression at a sufficient level. Accordingly, in the case where the 0 is often detected in the high-frequency component, the Hadamard transform is selected based on the judgment that the processing volume is small. In the case where 0 is not often detected in the high-frequency component, the discrete cosine transform is selected. The judgment is made by the selectors 10 and 12, however, may be made by an operation controller not shown.

Further, after being processed at the discrete cosine transform unit 1, the alternate-current component and the direct-current component are separated and then independently processed. Therefore, the dependency on the processing order induced by the inverse transform, which is seen in the conventional constitution, can be dissolved.

Figure 7:
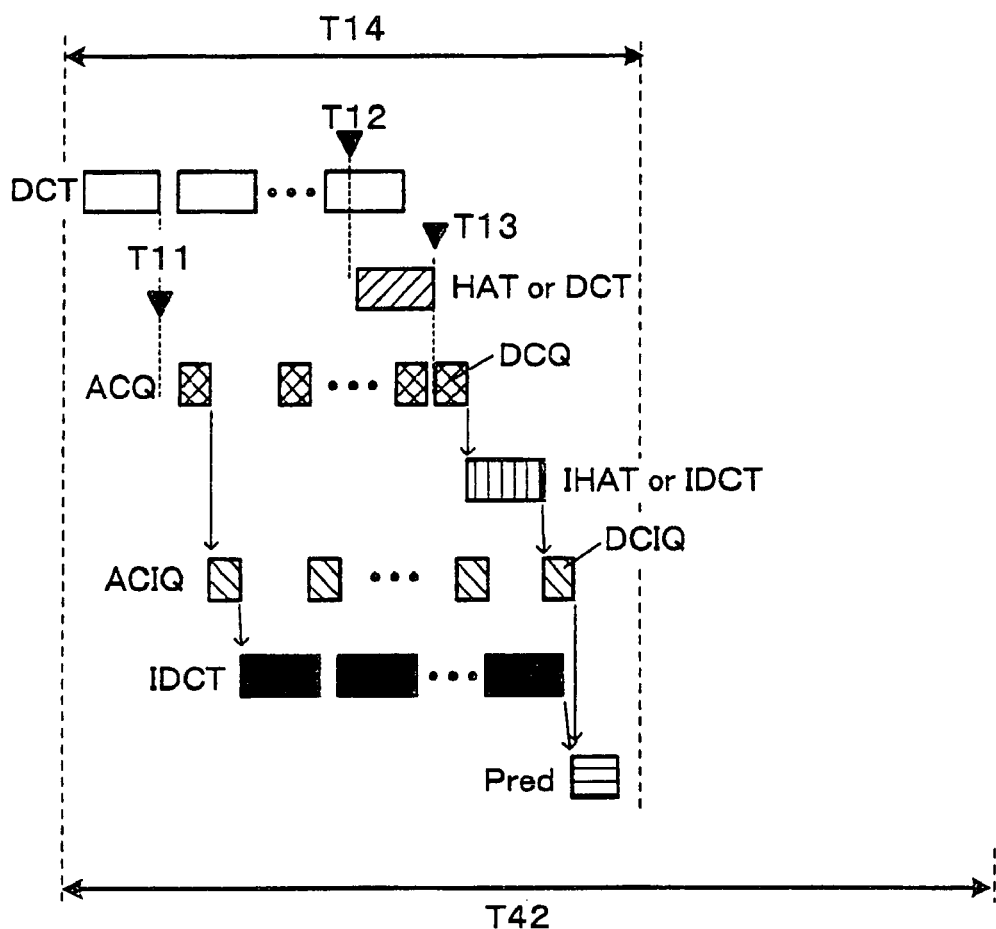
FIG. 7 is an illustration of processings in chronological order in the signal processor according to the preferred embodiment 2.

FIG. 7 shows processings in chronological order. The processings are basically similar to those shown in FIG. 2 according to the preferred embodiment 1. As the Hadamard transform (HAT) shown in FIG. 2, one of the Hadamard transform (HAT) and the second discrete cosine transform (DCT) is selected. Further, as the inverse Hadamard transform (IHAT) shown in FIG. 2, one of the inverse Hadamard transform (IHAT) and the second inverse discrete cosine transform (IDCT) is selected.

As described, the alternate-current component quantization (ACQ) is executed after the discrete cosine transform (DCT) is completed. Therefore, the alternate-current component quantization (ACQ) starts at and after Timing T11, and then, the alternate-current component inverse quantization (ACIQ) and the inverse discrete cosine transform (IDCT), which follow in the order sequentially start.

At Timing T12 parallelized (synchronized) with the timing of the execution of the discrete cosine transform (DCT) with respect to the last block of one processing unit (MB), it is selected which of the orthogonal transforms (Hadamard transform (HAT) and discrete cosine transform (DCT)) is adopted, and the selected processing starts. Therefore, the alternate-current component can be precedently processed until the timing T12. Further, the direct-current component quantization (DCQ) is executed after the orthogonal transform selected at the timing T12 (Hadamard transform (HAT) or discrete cosine transform (DCT)) is completed. Therefore, the direct-current component quantization (DCQ) starts at and after Timing T13. As a result, the maximum allocation time T14 of one processing unit (MB) is reduced to substantially a half of the processing time T42 in the conventional method, and the operation efficiency can be thereby improved.

Preferred Embodiment 3

In the preferred embodiments 1 and 2, the present invention is applied to the constitution wherein an orthogonal transform is executed after another orthogonal transform is executed.

Figure 8:
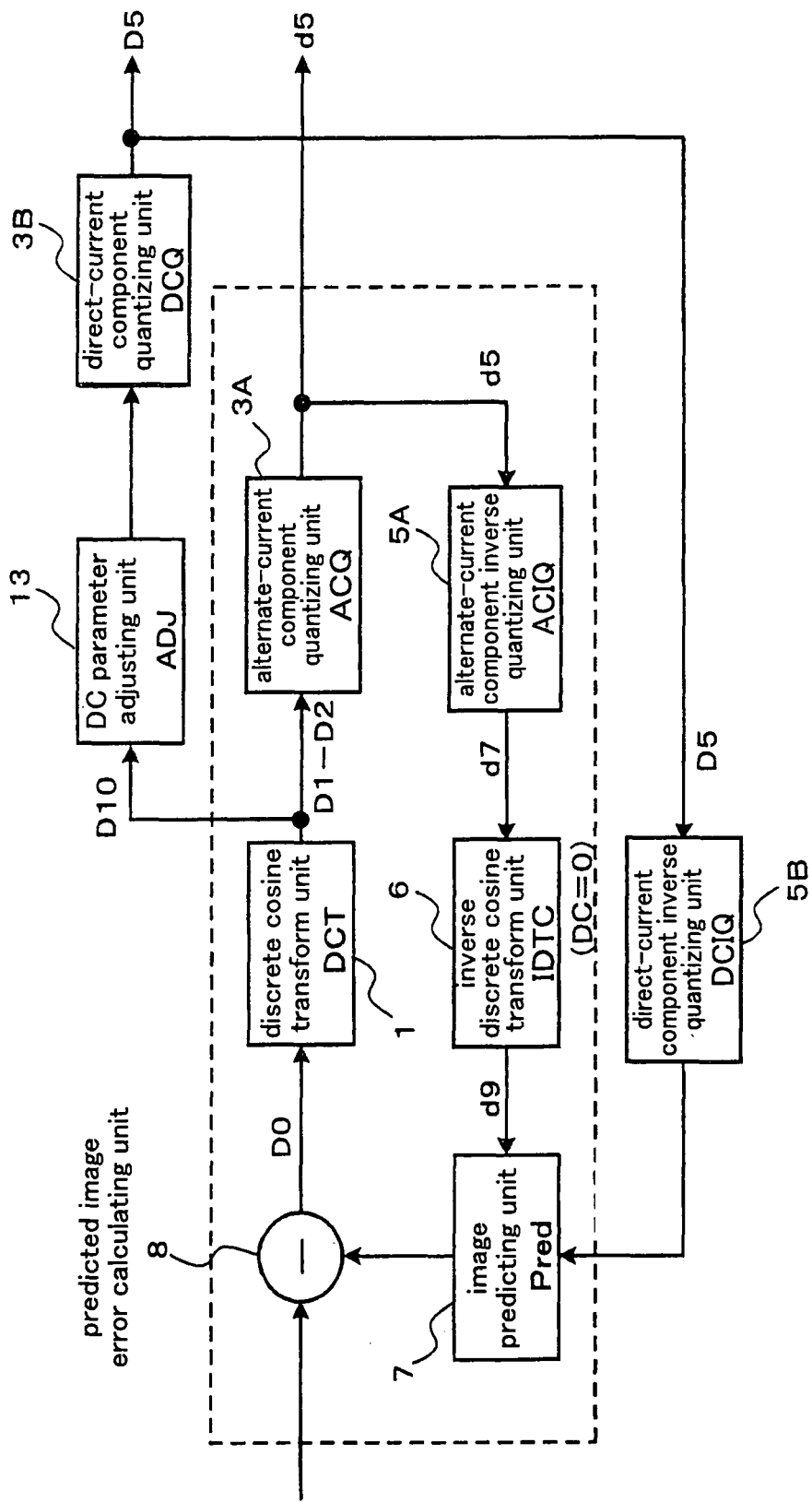
FIG. 8 is a block diagram illustrating a constitution of a signal processor (data compressing device) according to a preferred embodiment 3 of the present invention.

However, the present invention is not limited thereto, and the present invention can be applied to a signal processor wherein the parameter of the direct-current component showing the processing result of the discrete cosine transform unit 1 is adjusted by a DC parameter adjusting unit 13 as shown in a preferred embodiment 3 of the present invention shown in FIG. 8. In the constitution shown in FIG. 8, the Hadamard transform unit 2 and the inverse Hadamard transform unit 4 are omitted, and the DC parameter adjusting unit 13 is provided.

Describing the parameter adjustment referring to an example shown in FIG. 9A, an increase/decrease coefficient for including a plurality of direct-current components D10 within such a level that is defined by an upper-limit value Th1 and a lower-limit value Th2 thereof is determined, and the direct-current components D10 before the transform are adjusted to post-transform direct-current components D11 based on the increase/decrease coefficient. Thereby, a dynamic range defined by the direct-current component can be prevented from exceeding a range which is previously intended.

As another example of the parameter adjustment, as shown in FIG. 9B, an average value Dav of the plurality of direct-current components D10 before the transform is calculated, and the average value Dav is set to post-transform direct-current components D12 (the direct-current components D10 before the transform are transformed into the average value Dav). As a result, a variation of the direct-current component can be reduced.

As still another example of the parameter adjustment, as shown in FIG. 10A, high-frequency components of the plurality of direct-current components D10 before the transform are eliminated based on the distribution of the direct-current components. More specifically, the direct-current components D10 before the transform are smoothened, a smoothening result distribution Dis is calculated, and post-transform direct-current components D13 are adjusted to a value in vicinity of the calculated distribution Dis. As a result, the direct-current component can be prevented from drastically changing.

As still another example of the parameter adjustment, as shown in FIG. 10B, direct-current component ranges A1 and A2 where the encoding efficiency is high in the plurality of direct-current components D10 before the transform are calculated, and post-transform direct-current components D14 are adjusted to be included in the calculated ranges A1 and A2. As a result, the encoding efficiency is increased.

In the respective constitutions of the parameter adjustment (see FIGS. 9A-10B), the alternate-current component and the direct-current component are separated in and after the discrete cosine transform unit 1 and independently processed. As a result, the dependency on the processing order induced by the inverse transform, which is seen in the conventional method, can be dissolved.

Figure 11:
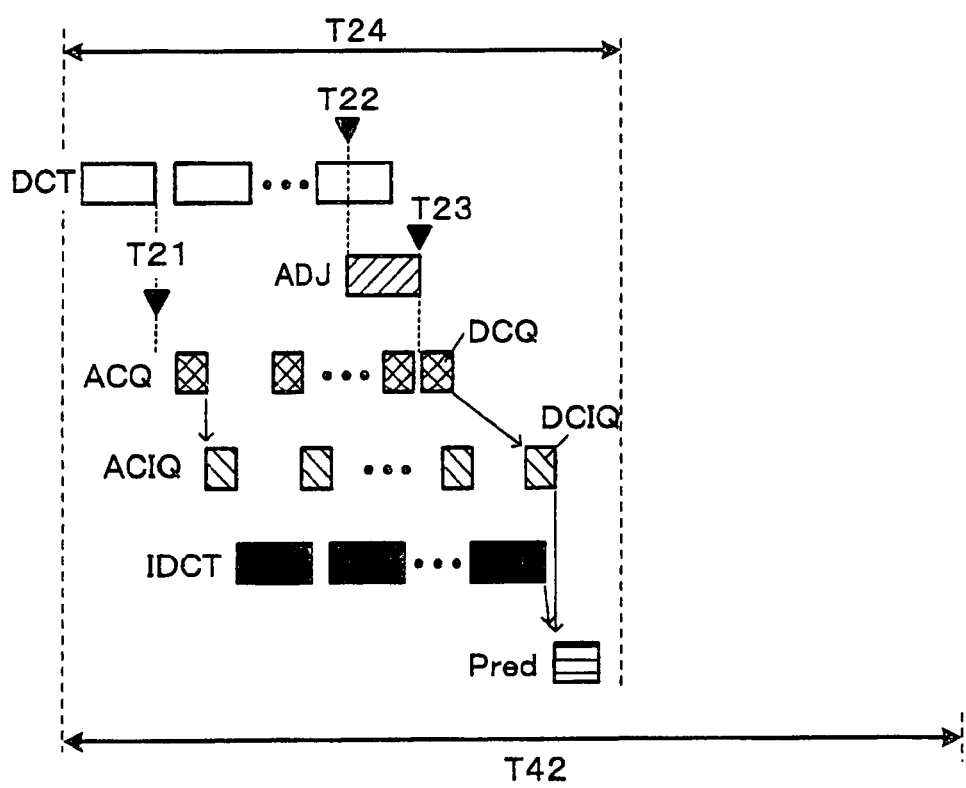
FIG. 11 is an illustration of processings in chronological order in the signal processor according to the preferred embodiment 3.

FIG. 11 shows processings in chronological order. The processings are basically similar to those shown in FIG. 2 according to the preferred embodiment 1, except for the Hadamard transform shown in FIG. 2 which is replaced with the DC parameter adjustment (ADJ).

As shown in FIG. 11, the alternate-current component quantization (ACQ) is executed after the discrete cosine transform (DCT) is completed. Therefore, the alternate-current component quantization (ACQ) starts at and after Timing T21, and then, the alternate-current component inverse quantization (ACIQ) and the inverse discrete cosine transform (IDCT) which follows in the order sequentially start. The contents of the parameter adjustment with respect to the direct-current component are determined at Timing T22 in parallel with the discrete cosine transform (DCT) with respect to the last block of one processing unit (MB), and the DC parameter adjustment (ADJ) starts. Therefore, the alternate-current component can be precedently processed until the DC parameter adjustment (ADJ) starts (until T22). Because the direct-current component quantization (DCQ) is executed after the DC parameter adjustment (ADJ) is completed, the direct-current component quantization (DCQ) starts at and after Timing T23. As a result, a maximum allocation time T24 of one processing unit (MB) is reduced to substantially a half of the processing time T42 in the conventional method, and the operation efficiency can be thereby improved.

Preferred Embodiment 4

The present invention is applied to the encoding method relating to the image data in the preferred embodiments described so far. However, the present invention is not limited thereto, and can be applied to an encoding process for, for example, audio data.

Figure 12:
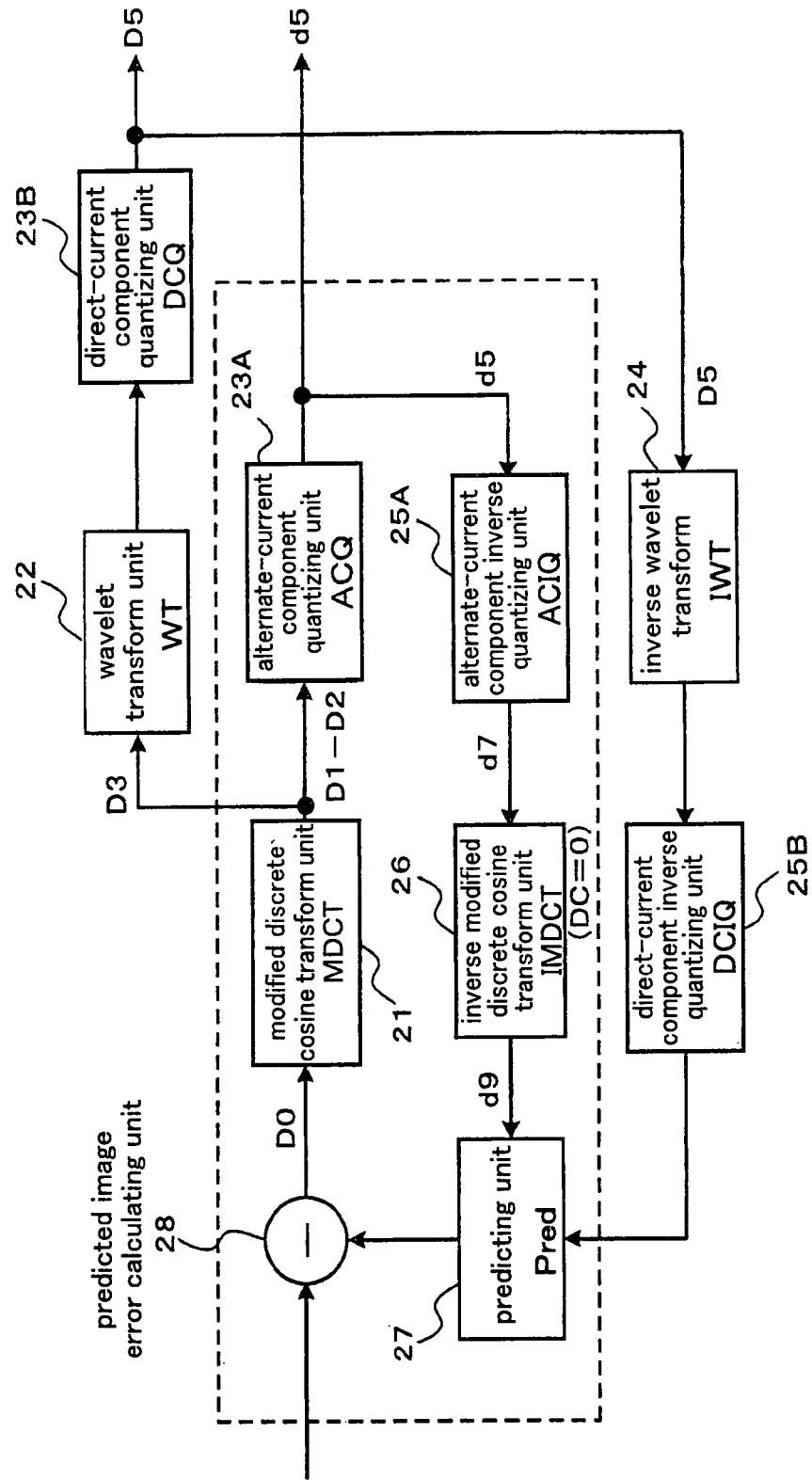
FIG. 12 is a block diagram illustrating a constitution of a signal processor (data compressing device) according to a preferred embodiment 4 of the present invention.

An audio data encoding device according to a preferred embodiment 4 of the present invention comprises, as shown in FIG. 12, a modified discrete cosine transform unit 21, a wavelet transform unit 22, an alternate-current component quantizing unit 23A, a direct-current component quantizing unit 23B, an inverse wavelet transform unit 24, an alternate-current component inverse quantizing unit 25A, a direct-current component inverse quantizing unit 25B, an inverse modified discrete cosine transform unit 26, a predicting unit 27, and a predicted error calculating unit 28.

In general, a modified discrete cosine transform (MDCT), which is a variation of the discrete cosine transform, is adopted in the orthogonal transform for audio compression, wherein any strain resulting from the compression is reduced. Further, it is generally recognized that the wavelet transform is the orthogonal transform suitable for waveform analysis, and the encoding efficiency can be increased when the wavelet transform is executed with respect to the distribution of the direct-current components.

Further, the alternate-current component and the direct-current component are separated in and after the discrete cosine transform unit 1 and independently processed. As a result, the dependency on the processing order induced by the inverse transform, which is seen in the conventional method, can be dissolved in the present preferred embodiment.

FIG. 13 shows processings in chronological order. The modified discrete cosine transform (MDCT), alternate-current component quantization (ACQ), alternate-current component inverse quantization (ACIQ), inverse modified discrete cosine transform (IMDCT), wavelet transform (WT), direct-current component quantization (DCQ), inverse wavelet transform (IWT), direct-current component inverse quantization (DCIQ), and prediction (Pred) are shown in chronological order in the drawing.

As shown above, the alternate-current component quantization (ACQ) is executed after the modified discrete cosine transform (MDCT) is completed. Therefore, the alternate-current component quantization (ACQ) starts at and after Timing T31, and then, the alternate-current component inverse quantization (ACIQ) and the inverse modified discrete cosine transform (IMDCT) which follow in the order sequentially start. The wavelet transform (WT) starts in parallel with the modified discrete cosine transform (MDCT) with respect to the last block of one processing unit (MB). Therefore, the alternate-current component can be precedently processed until the wavelet transform (WT) starts. Because the direct-current component quantization (DCQ) is executed after the wavelet transform (WT) is completed, the direct-current component quantization (DCQ) starts at and after Timing T32. Therefore, a maximum allocation time T33 of one processing unit (MB) is significantly reduced in comparison to the processing time in the conventional method. Accordingly, the operation efficiency can be increased in a manner similar to the respective preferred embodiments (embodiments of the encoding method relating to the image data).

As described in the foregoing preferred embodiments, the present invention can be applied to the encoding devices relating to the image and audio. For example, the present invention is applied to the respective preferred embodiments with respect to the luminance or color difference in the image encoding device, while the present invention is applied to the respective preferred embodiments with respect to the audio amplitude level in the audio encoding device.

The chronological processings shown in FIGS. 4, 7, 11 and 13 can be parallelized or executed in the time-sharing manner. Accordingly, an amount of time required for each processing can be reduced in accordance with the parallelization level in the case where they are parallelized, while a circuit source can be commonly used depending on a time-sharing multiplicity in the case where they are executed in the time-sharing manner.

FIG. 14A shows a schematic outer appearance of a mobile telephone 31 which is an example of a communication device comprising the signal processor according to the present invention. The mobile telephone 13 comprises an application LSI 32. The application LSI 32 is a semiconductor integrated circuit comprising the signal processor according to the present invention. The signal processor according to the present invention can be operated with less power than in the conventional device, and the application LSI 32 and the mobile telephone 31 comprising the application LSI 32 can also be operated with less power. Further, in any semiconductor integrated circuit provided in the mobile telephone 31 other than the application LSI 32, the effect similar to those of the respective preferred embodiments can be obtained when the signal processor according to the present invention is adopted as a logic circuit provided in the relevant semiconductor integrated circuit.

The communication device comprising the signal processor according to the present invention is not limited to the mobile telephone, and includes a transmitter, a receiver, a modem device for data transfer and the like in a communication system. The present invention can effectively reduce the power consumption in both of digital and analog systems irrespective of wired or radio communication and optical communication or electrical communication.

FIG. 14B shows a schematic outer appearance of an information reproducing device comprising the signal processor according to the present invention. An optical disc 33 comprises a medium signal processing LSI 34 for processing a signal read from an optical disc. The medium signal processing LSI 34 is a semiconductor integrated circuit comprising the signal processor according to the present invention. Because the encoding device according to the present invention is operable with less power than in the conventional device, the medium signal processing LSI 34 and the optical disc device 33 comprising the medium signal processing LSI 34 are also operable with less power. Further, in any semiconductor integrated circuit provided in the optical disc 33 other than the medium signal processing LSI 34, the effect similar to those of the respective preferred embodiments can be obtained when the signal processor according to the present invention is adopted as a logic circuit provided in the relevant semiconductor integrated circuit.

The information reproducing device comprising the signal processor according to the present invention is not limited to the optical disc device, but it also includes an image recording/reproducing device in which a magnetic disc is incorporated, an information recording/reproducing device in which a semiconductor memory is used as a medium and the like. According to the present invention, the power consumption can be effectively reduced for various types of information reproducing device (information recording function may be included) regardless of what kind of medium is used for information recording.

FIG. 14C shows a schematic outer appearance of a television receiver 35 which is an example of an image display device comprising the signal processor according to the present invention. The television receiver 35 comprises an image/audio processing LSI 36 for processing an image signal and an audio signal. The image/audio processing LSI 36 is a semiconductor integrated circuit comprising the signal processor according to the present invention. The signal processor according to the present invention is operable with less power than in the conventional device, and therefore, the image/audio processing LSI 36 and the television receiver 35 comprising the image/audio processing LSI 36 are also operable with less power. Further, in any semiconductor integrated circuit provided in the television receiver 35 other than the image/audio processing LSI 36, the effect similar to those of the respective preferred embodiments can be obtained when the signal processor according to the present invention is adopted as a logic circuit provided in the relevant semiconductor integrated circuit.

The image display device comprising the signal processor according to the present invention is not limited to the television receiver, and includes, for example, a device for displaying streaming data distributed via an electric communication circuit, and the like. According to the present invention, the power consumption can be effectively reduced in any image display device (information recording function may be included) irrespective of method of transmitting information.

FIG. 14D shows a schematic outer appearance of a digital camera 37 which is an example of an electronic device comprising the signal processor according to the present invention. The digital camera 37 comprises a signal processing LSI 38 which is a semiconductor integrated circuit comprising the signal processor according to the present invention. The signal processor according to the present invention can be operated with less power than in the conventional device, and therefore, the signal processing LSI 38 and the digital camera 37 comprising the signal processing LSI 38 can also be operated with less power. Further, in any semiconductor integrated circuit provided in the digital camera 37 other than the signal processing LSI 38, the effect similar to those of the respective preferred embodiments can be obtained when the signal processor according to the present invention is adopted as a logic circuit provided in the relevant semiconductor integrated circuit.

The electronic device comprising the signal processor according to the present invention is not limited to the digital camera, and includes devices generally available comprising a semiconductor integrated circuit, for example, various AV devices and the like. According to the present invention, the power consumption can be effectively reduced in electronic devices in general.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A data compressing method including:
a first step in which a first orthogonal transform is performed on a data so that an orthogonal transform data is generated; and
a subsequent processing step executed subsequent to the first step in which an inverse transform equivalent to a decoding process of the orthogonal transform data is executed on the orthogonal transform data, wherein:
the subsequent processing step includes a second step for processing an alternate-current component of the orthogonal transform data, a third step for processing a direct-current component of the orthogonal transform data, and a finalizing step,
the second step and the third step are performed in parallel,
the second step includes a first inverse orthogonal transform corresponding to the first orthogonal transform in the first step, the first inverse orthogonal transform being an inverse orthogonal transform in which the direct-current component of the orthogonal transform data is zero,
the third step includes a second orthogonal transform for the direct-current component of the orthogonal transform data, and a second inverse orthogonal transform corresponding to the second orthogonal transform,
the first step comprises plural first processing slices,
the second step for the alternate-current component comprises plural second processing slices,
a process for each of the plural second processing slices starts at an end of a corresponding process for each of the plural first processing slices,
the third step starts before completion of the last slice of the plural first processing slices, and
the finalizing step creates a sum of a result of each of the plural second processing slices and a result of the third step.

2. The data compressing method as claimed in claim 1, wherein:
the second step includes a first quantizing process for the alternate-current component of the orthogonal transform data obtained in the first step and a first inverse quantizing process corresponding to the first quantizing process, and
the third step includes a second quantizing process and a second inverse quantizing process corresponding to the second quantizing process for the direct-current component.

3. The data compressing method as claimed in claim 2, wherein
at least one of the first and second quantizing processes and at least one of the corresponding first and second inverse quantizing processes are executed in a time-sharing manner.

4. The data compressing method as claimed in claim 2, wherein:
the data includes an image data,
the second quantizing process of the direct-current component is a quantizing process of a direct-current component of luminance or color-different information of an image, and
a quantizing step in the second quantizing process is decided based on a result of the second orthogonal transform executed in the third step.

5. The data compressing method as claimed in claim 2, wherein:
the data includes an audio data,
the second quantizing process for the direct-current component is a quantizing process with respect to an audio amplitude level, and
a quantizing step in the second quantizing process is decided based on a result of the second orthogonal transform executed in the third step.

6. The data compressing method as claimed in claim 1, wherein
the first step, the second step and the third step are executed in a time-sharing manner.

7. The data compressing method as claimed in claim 1, wherein:
the data includes an image data,
the first orthogonal transform executed in the first step is a discrete cosine transform,
the second orthogonal transform executed in the third step is an Hadamard transform,
the first inverse orthogonal transform executed in the second step corresponding to the first step is an inverse discrete cosine transform, and
the second inverse orthogonal transform executed in the third step is an inverse Hadamard transform.

8. The data compressing method as claimed in claim 1, wherein:
the second orthogonal transform executed in the third step and the second inverse orthogonal transform are selected from a plurality of different orthogonal transforms and inverse orthogonal transforms corresponding thereto, and
a transform process is selected from the plurality of orthogonal transforms and the inverse orthogonal transforms corresponding thereto based on a result of the first transform executed in the first step.

9. The data compressing method as claimed in claim 1, wherein:
the data includes an audio data,
the first orthogonal transform executed in the first step is a modified discrete cosine transform,
the first inverse orthogonal transform executed in the second step corresponding to the first step is a modified inverse discrete cosine transform,
the second orthogonal transform executed in the third step is a wavelet transform, and
the second inverse orthogonal transform is an inverse wavelet transform.

10. The data compressing method as claimed in claim 1, wherein:
the direct-current component of the first orthogonal transform data is a first value, and a difference between the first value and a second value obtained from an inverse matrix of a second inverse orthogonal transform data in the second inverse orthogonal transform is added to elements of an inverse matrix of a first inverse orthogonal transform data in the first inverse orthogonal transform.

11. The data compressing method as claimed in claim 10, wherein:
the second step includes a first quantizing process for the alternate-current component of the first orthogonal transform data obtained in the first step and a first inverse quantizing process corresponding to the first quantizing process, and the third step includes a second quantizing process and a second inverse quantizing process corresponding to the second quantizing process for the direct-current component.

12. The data compressing method as claimed in claim 11, wherein
at least one of the first and second quantizing processes and at least one of the corresponding first and second inverse quantizing processes are executed in a time-sharing manner.

13. The data compressing method as claimed in claim 11, wherein:
the data includes an image data,
the second quantizing process for the direct-current component is a quantization process for a direct-current component of luminance or color-different information of an image, and
a quantizing step in the second quantizing process quantization is decided based on a result of the second orthogonal transform executed in the third step.

14. The data compressing method as claimed in claim 11, wherein:
the data includes an audio data,
the second quantizing process for the direct-current component is a quantizing process for an audio amplitude level, and
a quantizing step in the second quantizing process is decided based on a result of the second orthogonal transform executed in the third step.

15. The data compressing method as claimed in claim 10, wherein
the first step, the second step and the third step are executed in a time-sharing manner.

16. The data compressing method as claimed in claim 10, wherein
the data includes an image data,
the first orthogonal transform executed in the first step is a discrete cosine transform,
the second orthogonal transform executed in the third step is an Hadamard transform,
the first inverse orthogonal transform executed in the second step is an inverse discrete cosine transform, and
the second inverse orthogonal transform executed in the third step is an inverse Hadamard transform.

17. The data compressing method as claimed in claim 10, wherein
the second orthogonal transform and the second inverse orthogonal transform executed in the third step are selected from a plurality of different orthogonal transforms and inverse orthogonal transforms corresponding thereto based on a result of the first transform executed in the first step.

18. The data compressing method as claimed in claim 10, wherein:
the data includes an audio data,
the first orthogonal transform executed in the first step is a modified discrete cosine transform,
the first inverse orthogonal transform executed in the second step corresponding to the first step is a modified inverse discrete cosine transform,
the second orthogonal transform executed in the third step is a wavelet transform, and
the second inverse orthogonal transform executed in the third step corresponding to the third step is an inverse wavelet transform.

19. The data compressing method as claimed in claim 1, wherein:
the data includes an audio data,
a step in which the direct-current component is transformed is further provided, and
the step executes a parameter transform for deciding an image quality or a sound quality of the image data or the audio data.

20. The data compressing method as claimed in claim 19, wherein
the parameter transform is executed in a time-sharing manner.

21. The data compressing method as claimed in claim 19, wherein:
the data includes an image data,
the parameter transform is such a transform that includes a maximum value or a minimum value of the direct-current component of luminance or color-different information of an image in a desirable range, and
the desirable range is decided based on a result of the second orthogonal transform executed in the third step.

22. The data compressing method as claimed in claim 19, wherein:
the data includes an audio data,
the parameter transform is such a transform that includes a maximum value or a minimum value of a direct-current component of an audio amplitude level in a desirable range, and
the desirable range is decided based on a result of the second orthogonal transform executed in the third step.

23. The data compressing method as claimed in claim 19, wherein:
the data includes an image data,
the parameter transform is such a transform that uses an average value of direct-current components of a plurality of luminance informations as a direct-current component of the luminance or color-difference information of the image data, and
the average value is decided based on a result of the second orthogonal transform executed in the third step.

24. The data compressing method as claimed in claim 19, wherein:
the data includes an audio data,
the parameter transform is such a transform that uses an average value of direct-current components of a plurality of audio amplitude levels as a direct-current component of the audio amplitude level, and
the average value is decided based on a result of the second orthogonal transform executed in the third step.

25. The data compressing method as claimed in claim 19, wherein:
the data includes an image data,
the parameter transform is a process in which high-frequency components are eliminated from spatial frequency components of direct-current components of a plurality of luminance or color-difference informations of an image, and
a degree of the elimination in the high-frequency component eliminating process is decided based on a result of the second orthogonal transform executed in the third step.

26. The data compressing method as claimed in claim 19, wherein:
the data includes an audio data,
the parameter transform is a process in which a high-frequency component is eliminated from a spatial frequency component of a direct-current component of an audio amplitude level, and
a degree of the elimination in the high-frequency component eliminating process is decided based on a result of the second orthogonal transform executed in the third step.

27. The data compressing method as claimed in claim 19, wherein:
the data includes an image data,
the parameter transform is such a transform that sets a direct-current component of luminance or color-difference information on an image within a range where high-efficiency encoding is attainable, and
the range where high-efficiency encoding is attainable in the transform process is decided based on a result of the second orthogonal transform executed in the third step.

28. The data compressing method as claimed in claim 19, wherein:
the data includes an audio data,
the parameter transform is such a transform that sets a direct-current component of an audio amplitude level within a range where high-efficiency encoding is attainable, and
the range where high-efficiency encoding is attainable in the transform process is decided based on a result of the second orthogonal transform executed in the third step.

29. The data compressing method as claimed in claim 1, wherein the first orthogonal transform is different from the second orthogonal transform.

30. A signal processor comprising:
a first transform unit for generating an orthogonal transform data by performing a first orthogonal transform on a data; and
a subsequent transform unit for executing an inverse transform equivalent to an encoding process of the orthogonal transform data to the orthogonal transform data obtained by the first transform unit, wherein:
the subsequent transform unit includes a second transform unit for processing an alternate-current component of the orthogonal transform data, a third transform unit for processing a direct-current component of the orthogonal transform data, and a finalizing unit,
the second transform unit is configured to execute a first inverse orthogonal transform corresponding to the first orthogonal transform by the first transform unit, where the first inverse orthogonal transform is an inverse transform in which a direct-current component of the orthogonal transform data is zero,
the third transform unit is configured to execute a second orthogonal transform for the direct-current component of the orthogonal transform data, and a second inverse orthogonal transform corresponding to the second orthogonal transform,
the second transform unit and third transform unit are further configured to execute the respective processes for the alternate-current component and the direct-current component in parallel,
the first transform unit is further configured to process plural first processing slices,
the second transform unit is further configured to process plural second processing slices, and to start to process each of the plural second processing slices at an end of a corresponding process for each of the plural first processing slices,
the third transform unit is configured to start the process before completion of the last slice of the plural first processing slices, and
the finalizing unit is configured to create a sum of a result of each of the plural second processing slices and a result of the third transform unit.

31. A communication device comprising a semiconductor integrated circuit, wherein
the semiconductor integrated circuit comprises the signal processor as claimed in claim 30.

32. An information reproducing device comprising a semiconductor integrated circuit, wherein
the semiconductor integrated circuit comprises the signal processor as claimed in claim 30.

33. An image display device comprising a semiconductor integrated circuit, wherein
the semiconductor integrated circuit comprises the signal processor as claimed in claim 30.

34. An electronic device comprising a semiconductor integrated circuit, wherein
the semiconductor integrated circuit comprises the signal processor as claimed in claim 30.

35. The signal processor as claimed in claim 30, wherein the first orthogonal transform is different from the second orthogonal transform.

* * * * *